United States Patent [19]

Rohrer

[11] Patent Number: 4,568,350

[45] Date of Patent: Feb. 4, 1986

[54] COLD PAD-BATCH PROCESS FOR DYEING SILK OR SILK-CONTAINING FIBER BLENDS WITH REACTIVE DYES

[75] Inventor: Rudolf Rohrer, Riehen, Switzerland

[73] Assignee: Ciba-Geigy Corporation, Ardsley, N.Y.

[21] Appl. No.: 600,719

[22] Filed: Apr. 16, 1984

[30] Foreign Application Priority Data

Apr. 20, 1983 [CH] Switzerland .......................... 2125/83

[51] Int. Cl.$^4$ .......................... D06P 3/10; C09B 62/00
[52] U.S. Cl. ............................................ 8/543; 8/533; 8/549; 8/648; 8/657; 8/661; 8/680; 8/681; 8/682; 8/917
[58] Field of Search .......................... 8/543, 549, 533

[56] References Cited

U.S. PATENT DOCUMENTS

| | | | |
|---|---|---|---|
| 2,895,785 | 7/1959 | Alsberg et al. | 8/602 |
| 2,950,165 | 8/1960 | Hadfield et al. | 8/662 |
| 3,178,254 | 4/1965 | Hoelzle et al. | 8/589 |
| 3,334,960 | 8/1967 | Abel | 8/604 |
| 3,356,445 | 12/1967 | Ulrich et al. | 8/603 |
| 3,363,972 | 1/1968 | Ulrich et al. | 8/597 |
| 3,975,151 | 8/1976 | Berg et al. | 8/482 |
| 4,443,224 | 4/1984 | Opitz | 8/527 |
| 4,447,357 | 5/1984 | Holzle et al. | 260/153 |

FOREIGN PATENT DOCUMENTS

126025 11/1984 European Pat. Off. .

OTHER PUBLICATIONS

Chemical Abstracts, vol. 94, 1981, 210155 w.

*Primary Examiner*—A. Lionel Clingman
*Attorney, Agent, or Firm*—Wenderoth, Lind & Ponack

[57] ABSTRACT

A process for dyeing silk or silk-containing fiber blends with reactive dyes, which comprises dyeing or impregnating said material with a reactive dye of the formula $$D-Y]_n$$

wherein D is the radical of a sulfo group containing dye of the mono- or polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide series, $[Y]_n$, where n is 1 to 4, denotes identical or different reactive radicals Y, in aqueous medium at a pH value above 8, without the addition of a dispersant or swelling agent, and in the temperature range from 20° to 40° C. for 6 to 48 hours, and storing the impregnated goods in the moist state for 6 to 48 hours at a temperature from 20° to 60° C.

Dyeings with good fastness properties are obtained with this process.

18 Claims, No Drawings

COLD PAD-BATCH PROCESS FOR DYEING SILK OR SILK-CONTAINING FIBER BLENDS WITH REACTIVE DYES

The present invention relates to the use of reactive dyes for dyeing or printing silk or fibre blends containing silk.

Depending on the requirements, textiles made of silk or blends of pure silk and wool can be dyed with dyes belonging to a variety of classes. In actual practice, acid and metal complex dyes which are also suitable for dyeing wool are principally used. The increased demands made in recent times with respect to wetfastness properties have also led to the use of reactive dyes. However, the dyeing methods proposed in the literature up to now frequently yield unsatisfactory results. Thus only low degrees of fixation are achieved in some recommended dyeing methods.

It is the object of the present invention to provide a novel improved process for dyeing or printing silk or silk-containing fibre blends with reactive dyes, with which process fast dyeings are obtained. This object is accomplished with the process of the present invention, which satisfies the desired requirements.

The process of this invention comprises dyeing or impregnating silk or silk-containing fibre blends with reactive dyes of the formula $$D-[Y]_n \qquad (1)$$

wherein D is the radical of a sulfo group containing dye of the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $[Y]_n$, where n is 1 to 4, denotes identical or different reactive radicals Y, in aqueous medium at a pH value above 8, without the addition of a dispersant and swelling agent, and in the temperature range from 20° to 40° C. for 6 to 48 hours, and storing the impregnated goods in the moist state for 6 to 48 hours at a temperature from 20° to 60° C.

In the process of this invention, silk or silk-containing blended fabric is impregnated either with an aqueous padding liquor at a pH value above 8, preferably at pH 9 to 10, and the impregnated goods are stored, in the moist state, for 6 to 48 hours, preferably for 24 hours, at a temperature from 20° to 60° C., or in an aqueous liquor at a pH value above 8, preferably at pH 9 to 10, and at a temperature from 20° to 40° C., for 6 to 48 hours preferably for 24 hours. A dispersant or swelling agent will normally be understood as meaning urea, thiourea or sodium cyanoacetate.

In the process of this invention it is preferred to use:
(a) reactive dyes of the formula (1), wherein D is the radical of a mono- or disazo dye;
(b) reactive dyes of the formula (1), wherein D is the radical of a heavy metal azo complex dye;
(c) reactive dyes of the formula (1), wherein D is the radical of an anthraquinone dye;
(d) reactive dyes of the formula (1), wherein D is the radical of a copper or nickel phthalocyanine, of a copper-formazan complex or of a triphenedioxazine;
(e) reactive dyes of the formula (1), wherein D is the radical of a 1:2 chromium or 1:2 cobalt complex azo dye of the benzene or naphthalene series, the chromium or cobalt atom being attached in each case to a metallisable group in the ortho-position tto the azo bond;
(f) reactive dyes of the formula $$[D_1-N=N-K][Q-Y]_n \qquad (2)$$

wherein $D_1$ is the radical of a diazo component of the benzene or naphthalene series, K is the radical of a coupling component of the benzene, naphthalene or heterocyclic series, Q is a direct bond, an aminobenzoylamino group or a bridge member —N(R)—, in which R is hydrogen or unsubstituted or substituted $C_1$–$C_4$alkyl, Y and n are as defined for formula (1) and the reactive radical is attached to the diazo component or to the coupling component, or both the diazo component and the coupling component each carry one or two reactive radicals, or two reactive radicals are attached to the coupling component or to the diazo component, or two reactive radicals are attached to the diazo component or to the coupling component, and one reactive radical is attached to the coupling component or to the diazo component;
(g) reactive dyes of the formula (2), wherein R is hydrogen or methyl.

The radical D in formula (1) can be substituted in the usual manner and preferably contains one or more sulfonic acid groups.

Typical examples of further substituents at the radical D are: $C_1$–$C_4$alkyl groups such as methyl, ethyl, propyl, isopropyl and butyl; $C_1$–$C_4$alkoxy groups such as methoxy, ethoxy, propoxy, isopropoxy and butoxy; $C_1$–$C_6$acylamino groups such as acetylamino and propionylamino, benzoylamino, amino, $C_1$–$C_4$alkylamino, phenylamino, $C_1$–$C_4$alkoxycarbonyl, nitro, cyano, trifluoromethyl, halogen such as fluorine, chlorine and bromine, sulfamoyl, carbamoyl, ureido, carboxy, hydroxy, sulfomethyl and sulfo.

Substituents present in those reactive dyes, wherein D is the radical of an azo dye, are in particular methyl, ethyl, methoxy, ethoxy, benzoylamino, amino, acetylamino, ureido, sulfomethyl, hydroxy, carboxy, halogen or sulfo.

A $C_1$–$C_4$alkyl radical R in formula (2) can be further substituted, e.g. by halogen, hydroxy, cyano, alkoxy, carboxy or sulfo.

Representative examples of R are the following substituents: methyl, ethyl, propyl, isopropyl, butyl, isobutyl, sec-butyl, tert-butyl, carboxymethyl, β-carboxethyl, β-carboxypropyl, methoxycarbonylmethyl, ethoxycarbonylmethyl, β-methoxyethyl, β-ethoxyethyl, β-methoxypropyl, β-chloroethyl, γ-chloropropyl, γ-bromopropyl, β-hydroxyethyl, β-hydroxybutyl, β-cyanoethyl, sulfomethyl, β-sulfoethyl, aminosulfonylmethyl and β-sulfatoethyl.

The dyes of the formula (1) contain at least one fibre-reactive radical. By fibre-reactive compounds are meant those compounds which are able to react with the hydroxyl groups of cellulose or with the amino, hydroxy or thiol groups of natural or synthetic polyamides to form covalent bonds.

It is preferred to use reactive dyes of the formula (1) or (2), wherein Y is vinylsulfonyl, sulfatoethylsulfonyl, α-bromoacryloyl, α,β-dibromopropionyl, halopyrimidinyl or halotriazinyl. It is most preferred to use reactive dyes of the formula (1) or (2), wherein Y is 2,4-difluoro-5-chloropyrimid-6-yl, 2-methylphenylamino-, 2-sulfophenylamino- or 2-chlorophenylamino-4-fluoro-1,3,5-triazin-6-yl, 2-[N-methyl- N-(methylphenyl- or chlorophenyl- or sulfophenyl-)amino]-4-fluoro-1,3,5-triazin-6-yl, 2-[N-ethyl-N(methylphenyl- or chlorophenyl or sulfophenyl)amino]-4-fluoro-1,3,5-triazin-6-yl, α,β-dibromopropionyl, α-bromoacryloyl, 2-(β-chloroethylsulfonylethylamino)-4-fluoro-1,3,5-triazin-6-yl, 2,4-dichloropyrimidinyl-5-carbonyl, 2-chloro-4-isopropoxy-1,3,5-triazin-6-yl or 2-methoxy-4-fluoro-1,3,5-triazin-6-yl. The α,β-dibromopropionyl radical and the α-bromoacryloyl radical are most preferred.

The reactive dyes of the formula (1) used in this invention are known. They can be prepared by introducing the reactive radicals Y into a dye containing the radical D or into a dye precursor, in a manner known per se, and, if dye precursors are used, converting these into the desired final dyes.

The introduction of the fibre-reactive group or groups Y into the dyestuff radical D in formula (1) is effected in a manner known per se by reacting said dyestuff radicals with one or more compounds which introduce or form the radical or radicals Y, which radical D in formula (1) must contain functional groups suitable for attaching the fibre-reactive group or groups Y to the radical D. Examples of such groups suitable for attaching the groups Y to the radical D are free or monoalkylated amino groups such as —NH$_2$', —N(CH$_3$)H or —N(C$_2$H$_5$)H or, for example, the β-oxyethylsulfonyl group.

It is preferred to introduce reactive radicals into dyes containing one or two free amino groups by acylation with fibre-reactive acylating agents.

The formation of the fibre-reactive group or groups attached direct to the radical D, e.g. the β-sulfatoethylsulfonyl group, is effected in a manner known per se, e.g. by sulfation of the β-oxyethylsulfonyl group.

The process variant in which dyestuff precursors are used as starting materials is suitable for obtaining reactive dyes of the formula (1), wherein D is the radical of a dye consisting of two or more than two components. Examples of such dyes consisting of two or more components are monoazo, disazo, metal complex azo, formazan and azomethine dyes.

If the dye is e.g. an azo dye, it is possible to react a diazo component which, in addition to containing the amino group to be diazotised, contains an —N(R)H group or an aminobenzoylamino group, or a coupling component which contains an —N(R)H group or an aminobenzoylamino group, with an acyl halide, and subsequently to convert the resultant product into the desired azo dye by coupling to the other component, and then optionally to carry out a further conversion reaction.

By means of this process variant it is possible to prepare reactive dyes of the formula (1) which contain two reactive radicals by using a diazo component and coupling component which each contain an —N(R)H group and/or an aminobenzoylamino group, and carrying out acylation before or after the coupling.

Dyes of the formula (1) which contain two reactive radicals can also be prepared by using dyes which already contain a reactive radical in the radical D, or which contain two acylatable —N(R)H groups, and acylating them together. If the reactive dyes so prepared contain groups which are capable of metal complexing, then the reactive dyes can also subsequently be metallised.

Dyes of the formula (1) which contain more than two reactive radicals can be obtained e.g. by using dyes which already contain one or two reactive radicals in the radical D, and reacting these dyes with further components which contain reactive radicals or which can be converted into reactive radicals, and optionally carrying out a further conversion reaction.

In principle, the reactive dyes of the formula (1) of all dye classes can be prepared in a manner known per se, or by methods analogous to known ones, by starting from precursors or intermediates of dyes which contain fibre-reactive radicals or by introducing these fibre-reactive radicals into intermediates of dyestuff character which are suitable for this purpose.

The acylation of the amino dyes or the dyestuff precursors with the acyl halides is carried out by methods which are known per se, preferably in aqueous solution or suspension and in the presence of alkaline acid acceptors, e.g. aqueous alkali metal hydroxides, carbonates or bicarbonates.

A further conversion reaction, which can sometimes be carried out immediately after the synthesis, comprises treating a reactive dye of the formula (1) which contains an α,β-dibromopropionylamino radical with a dehydrohalogenating agent such as sodium hydroxide, so that the α,β-dibromopropionyl group is converted into the α-bromoacryloyl group.

Possible starting materials which can be used for the preparation of the reactive dyes of the formula (1) are listed individually below. Suitable amino dyes are, in particular, those dyes of the following structural formulae:

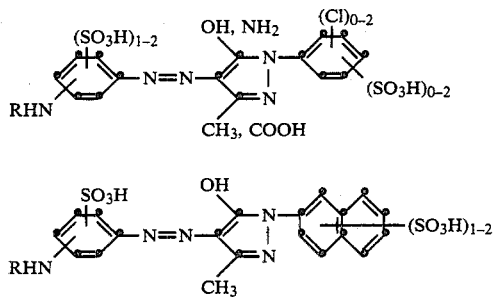

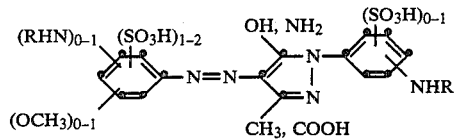

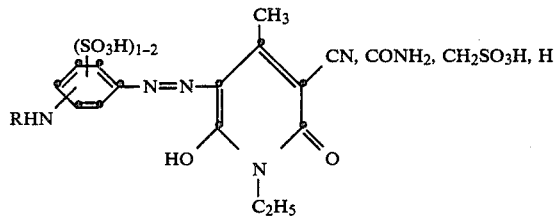

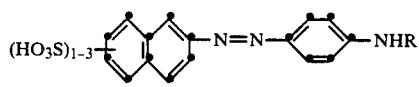
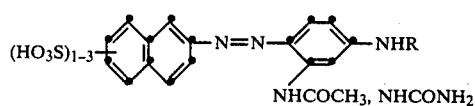
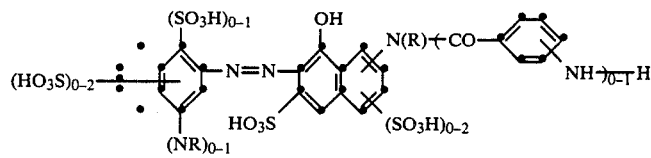
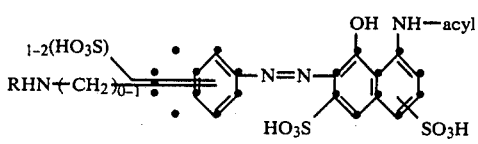
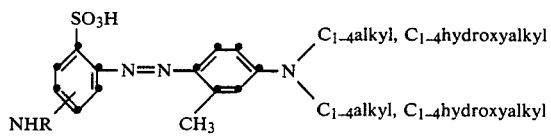
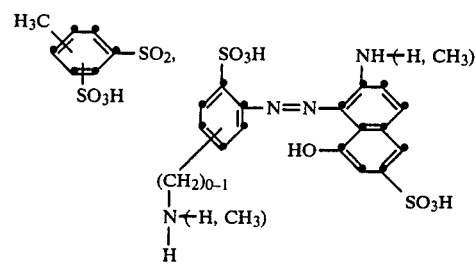
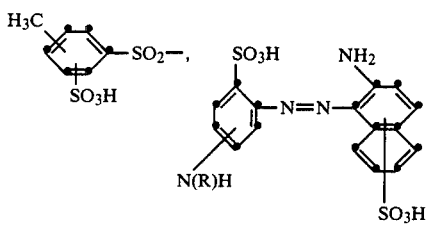

wherein acyl is e.g. acetyl or unsubstituted or substituted benzoyl. Metal complexes of dyes of the formulae

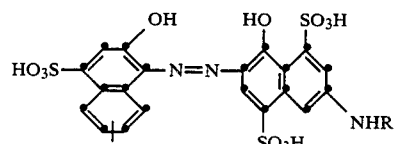
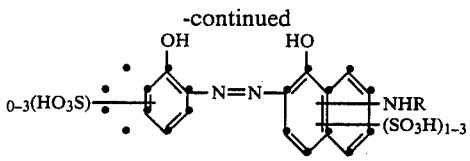
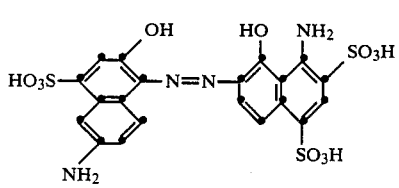
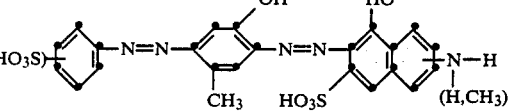

The preferred metal atom is Cu (1:1 complex) or Cr and Co (1:2 complex). Chromium and cobalt complexes may contain the azo compound of the above formula once or twice, i.e. they may have a symmetrical structure or an unsymmetrical structure with any other ligand groups.

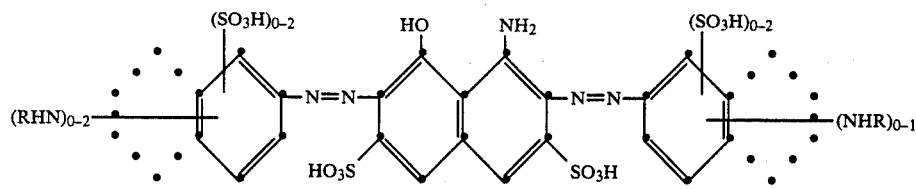

The condensed rings indicated by dotted lines denote possible alternative naphthalene systems.

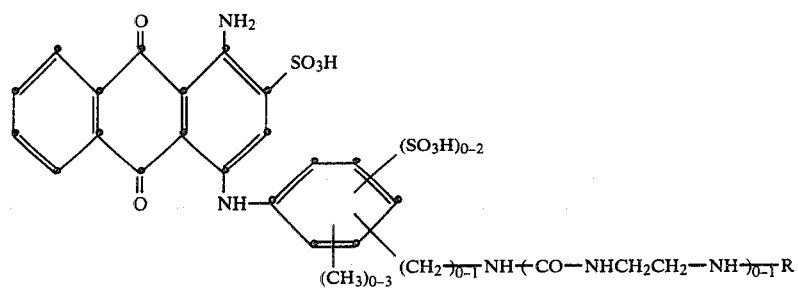
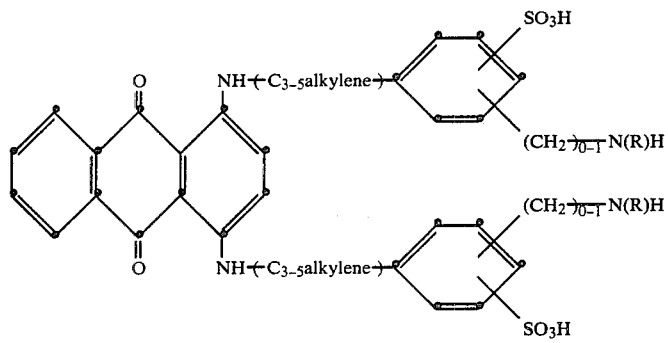
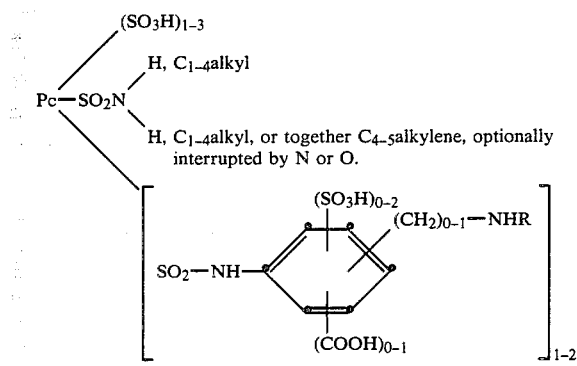
In this formula, PC is the Cu- or Ni-phthalocyanine radical. The total number of substituents at the Pc nucleus is 4.
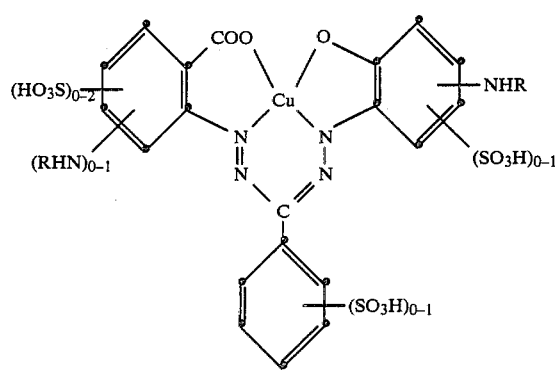
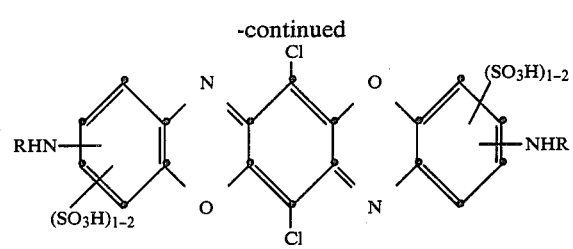
The dyes of the above formulae can be further substituted in the alkyl or aryl moieties, in particular by the substituents specified above in the definition of D in formula (1).
Particularly important azo dyes of the formula (2) are the following:
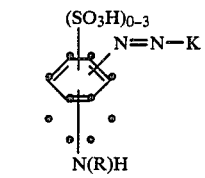

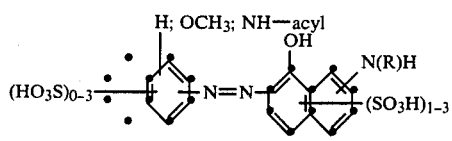

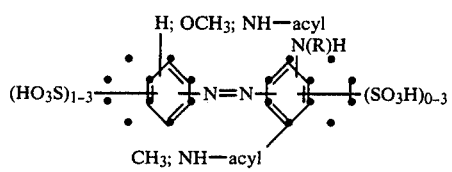

and

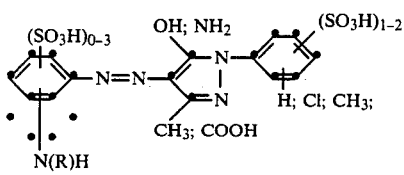

wherein K is the radical of a coupling component of the benzene, naphthalene or heterocyclic series, acyl is a low molecular aliphatic acyl radical containing not more than 3 carbon atoms or is an aromatic radical containing not more than 8 carbon atoms, and R is as defined for formula (2); as well as the metal complex azo dyes of the formulae

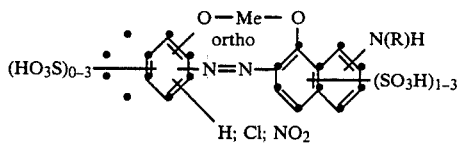

and

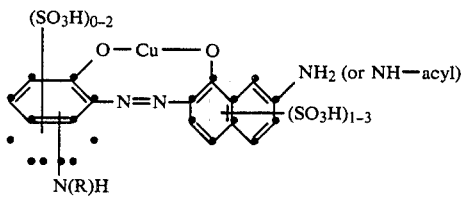

wherein R and acyl have the meanings assigned to them above and Me is Cu, Cr or Co.

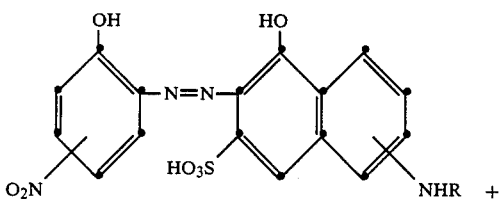

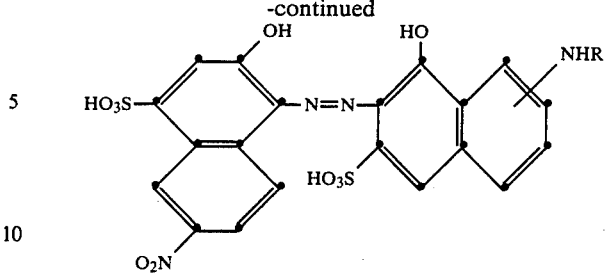

Asymmetrical 1:2 chromium or 1:2-cobalt complex.

If the starting materials employed for obtaining the preferred reactive dyes of the formula (1), wherein D is the radical of an azo dye, are not final amino dyes, e.g. those described above, but dyestuff precursors, i.e. the diazo and coupling components, then these are e.g.:

Diazo components aminobenzene, 1-amino-2-, -3- or -4-methylbenzene, 1-amino-2-, -3-or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminodiphenyl, 1-aminobenzene-2-, -3- or -4-carboxylic acid, 2-aminodiphenylether, 1-aminobenzene-2-, -3- or -4-sulfonamide, -N-methylamide, -N-ethylamide, -N,N-dimethylamide or -N,N-diethylamide, dehydrothio-p-toluidine-sulfonic acid, 1-amino-3-trifluoromethylbenzene-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1,3-diaminobenzene-4-sulfonic acid, 1,4-diaminobenzene-3-sulfonic acid, 1,4-diaminobenzene-3-sulfonic acid, 1,4-diaminobenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8 or -6,8-disulfonic acid 1-aminonaphthalene-2,5,7-trisulfonic acid, 2-aminonaphthalene-1,5,7-, 3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonyl benzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid.

Coupling components phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxy- naphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(3'-aminobenzoylamino)-8-hydroxynaphthalene-3,6-or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazol-5-one, 1-phenyl-3-methylpyrazol-5-one, 1-(4'-sulfophenyl)-3-methylpyrazol-5-one, 1-(4'-sulfophenyl)-pyrazol-5-one-3-carboxylic acid, 1-(3'-aminophenyl)-3-methylpyrazol-5-one, 1-(2',5'-disulfophenyl)-3-methylpyrazol-5-one, 1-(2'-methyl-4'-sulfophenyl)-pyrazol-5-one-3-carboxylic acid, 1-(4',8'-disulfonaphthaly-[2']-3-methylpyrazol-5-one, 1-(5',7'-disulfonaphthyl-[2']-3-methylpyrazol-5-one, 1-(2',5'-dichloro-4'-sulfophenyl)-3-methylpyrazol-5-one, 3-aminocarbonyl-4-methyl-6-hydroxypyrid-2-one, 1-ethyl-3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridin, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid.

If dyestuff precursors are used as starting materials, at least one of the two components (diazo component or coupling component) must contain an acylatable amino group. The diazotisation of the intermediates which contain a diazotisable amino group is normally carried out by treatment with nitrous acid in an aqueous solution of mineral acid at low temperature, and the coupling is carried out at weakly acid, neutral or weakly alkaline pH values.

Suitable acylating agents which, in addition to the acylating position, also contain a reactive radical which is able to form a covalent bond with silk, are in particular the halides or anhydrides of organic acids which contain easily replaceable atoms or groups of atoms.

Examples of such acylating agents are:

chloro- or bromoacetyl chloride, $\beta$-chloro- or $\beta$-bromopropionyl chloride, $\alpha,\beta$-dichloro- or $\alpha,\beta$-dibromopropionyl chloride, chloromaleic anhydride, carbyl sulfate, acryloyl chloride, $\beta$-chloro-or $\beta$-bromoacryloyl chloride, $\alpha$-chloro- or $\alpha$-bromoacryloyl chloride, $\alpha,\beta$-dichloro- or $\alpha,\beta$-dibromoacryloyl chloride, trichloroacryloyl chloride, chlorocrotonyl chloride, propiolyl chloride, 3,5-dinitro-4-chlorobenzenesulfochloride or 3,5-dinitro-4-chlorobenzenecarboxylic acid chloride, 3-nitro-4-chlorobenzenesulfochloride or 3-nitro-4-chlorobenzenecarboxylic acid chloride, 2,2,3,3-tetrafluorocyclobutane-1-carboxylic acid chloride, 2,2,3,3-tetrafluorocyclobutyl-acryloyl chloride, $\beta$-chloroethylsulfonyl-endomethylenecyclohexanecarboxylic acid chloride, acrylsulfonyl-endomethylenecyclohexanecarboxylic acid chloride, 2-chlorobenzoxazolecarboxylic acid chloride, 2-chlorobenzthiazolecarboxylic acid chloride, 2-chlorobenzthiazolesulfonic acid chloride, 4,5-dichloro-1-phenylpyridazonecarboxylic acid chloride or 4,5-dichlorophenylpyridazonesulfochloride, 4,5-dichloropyridazolpropionyl chloride, 1,4-dichlorophthalazinecarboxylic acid chloride or 1,4-dichlorophthalazine-sulfochloride, 2,3-dichloroquinoxalinecarboxylic acid chloride or 2,3-dichloroquinoxaline-sulfochloride, 2,4-dichloroquinazolinecarboxylic acid chloride or 2,4-dichloroquinazolinesulfochloride, 2-methanesulfonyl-4-chloro-6-methylpyrimidine, 2,4-bis-methanesulfonyl-6-methylpyrimidine, 2,4,6-tri-or 2,4,5,6-tetra-chloropyrimidine, 2,4,6-tri- or 2,4,5,6-tetra-bromopyrimidine, 2-methanesulfonyl-4,5-dichloro-6-methylpyrimidine, 2,4-dichloropyrimidine-5-sulfonic acid, 5-nitro- or 5-cyano-2,4,6-trichloropyrimidine, 2,6-bis-methanesulfonylpyridine-4-carboxylic acid chloride, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo-5-bromomethylpyrimidine, 2,5,6-trichloro-4-methylpyrimidine, 2,6-dichloro-5-trichloromethylpyrimidine, 2,4-bismethylsulfonyl-5-chloro-6-methylpyrimidine, 2,4,6-trimethylsulfonyl-1,3,5-triazine, 2,4-dichloropyrimidine, 3,6-dichloropyridazine, 3,6- dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxamide or -sulfonamide or -4- or -5-sulfochloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulfochloride, 5-nitro-6-methyl-2,4-dichloropyrimidine, 2,4,6-trichloro-5-bromopyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro-(-tribromo- or -trifluoro)-s-triazine, and also 4,6-dichloro(-dibromo- or -difluoro)-s-triazine which are substituted in the 2-position by an aryl or alkyl radical, for example a phenyl, methyl or ethyl radical, or by the radical of an aliphatic or aromatic compound which is bonded through the sulfur atom or through the oxygen atom, or in particular by a —NH₂ group or by the radical of an aliphatic, heterocyclic or aromatic amino compound which is bonded through the nitrogen atom.

The 4,6-dihalo-s-triazines which are substituted in the 2-position are obtained, for example, by reaction of trihalo-s-triazines with the above amino, hydroxyl or mercapto compounds. The substituent in the 2-position of a 4,6-dihalo-s-triazine can be for example the radical of one of the following amino, hydroxy and mercapto compounds:

ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, 1-naphthylamine, 2-naphthylamine, 2-amino-1-hydroxynaphthalene, 1-amino-4-hydroxynaphthalene, 1-amino-8-hydroxy-napthalene, 1-amino-2-hydroxy-naphthalene, 1-amino-7-hydroxy-naphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-amino-toluene-5-sulfonic acid, p-aminosalicyclic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8-, and -5,8-disulfonic acid, 2-naphthylamine-1,5-, -1,6-, -1,7-, -3,6-, -3,7-, -4,7-, -4,8-, -5,7- and -6,8-disulfonic acid, -1-naphthylamine-2,4,6-, -2,4,7-, -2,5,7-, -3,5,7-, -3,6,8- and -4,6,8-trisulfonic acid, 2-naphthylamino-1,3,7-, -1,5,7-, -3,5,7-, -3,6,7-, -3,6,8- and -4,6,8-trisulfonic acid, 2-, 3- and 4-aminopyridine, 2-aminobenzthiazole, 5-, 6- and 8-aminoquinoline, 2-aminopyrimidine, morpholino, piperidine, piperazine, water, methanol, ethanol, propanol, isopropanol, n-butanol, isobutanol, sec-butanol, tert-butanol, hexanol, cyclohexanol, β-methoxyethanol, β-ethoxyethanol, γ-methoxypropanol, γ-ethoxypropanol, β-ethoxy-β-ethoxyethanol, glycolic acid, phenol, o-, m- and p-chlorophenol, o-, m- and p-nitrophenol, o-, m- and p-hydroxybenzoic acid, o-, m- and p-phenolsulfonic acid, phenol-2,4-disulfonic acid, α-naphthol, β-naphthol, 1-hydroxynaphthalene-8-sulfonic acid, 2-hydroxynaphthalene-1-sulfonic acid, 1-hydroxynaphthalene-5-sulfonic acid, 1-hydroxynaphthalene-4-sulfonic acid, 1-hydroxynaphthalene-6- or -7-sulfonic acid, 2-hydroxynaphthalene-6-, -7- or -8-sulfonic acid, 2-hydroxynaphthalene-4-sulfonic acid, 2-hydroxynaphthalene-4,8- or -6,8-disulfonic acid, 1-hydroxynaphthalene-4,8-disulfonic acid, 2-hydroxynaphthalene-3,6-disulfonic acid, methanethiol, ethanethiol, propanethiol, isopropanethiol, n-butanethiol, thioglycollic acid, thiourea, thiophenol, α-thionaphthol, β-thionaphthol, β-sulfatoethylaminoethylamine.

Further eligible compounds are those of dyestuff character, for example 4-nitro-4'-aminostilbenedisulfonic acid, 2-nitro-4'-aminodiphenylamino-4,3'-stilbenedisulfonic acid, 2-nitro-4'-aminodiphenylamino-4,3'-disulfonic acid and, in particular, aminoazo dyes or aminoanthraquinones or phthalocyanines which additionally contain at least one reactive amino group.

The introduction of the substituent in the 2-position of the triazine radical can also be performed after coupling or metallisation. Accordingly, one of the above amino, hydroxy or mercapto compounds can be condensed subsequently with a dihalo-s-triazine radical which is already attached to the azo dye.

In addition to the reactive radicals which can be introduced by acylation, other suitable reactive radicals are the vinylsulfone, β-sulfatoethylsulfone or thiosulfatoethylsulfone, β-thiosulfatopropionylamide, β-thiosulfatoethylsulfonylamide or sulfonic acid N,β-sulfatoethylamide group, which radicals are introduced into the diazo component by other means, e.g. by ester or thioester formation.

Examples of those dyes into which a further reactive radical group can be introduced by acylation are:

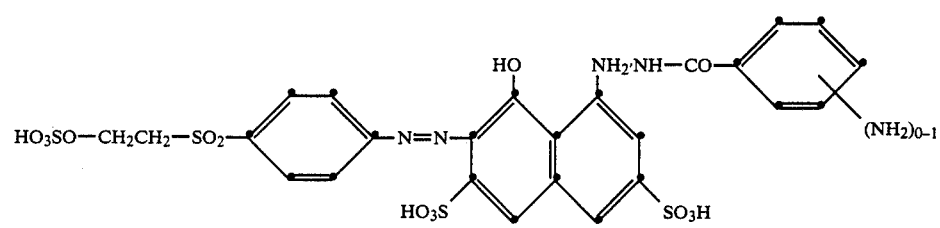

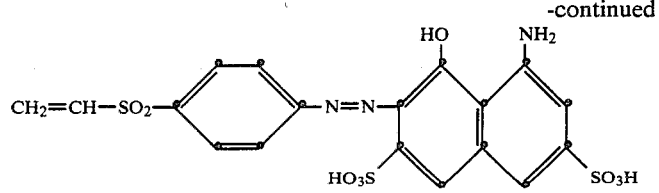
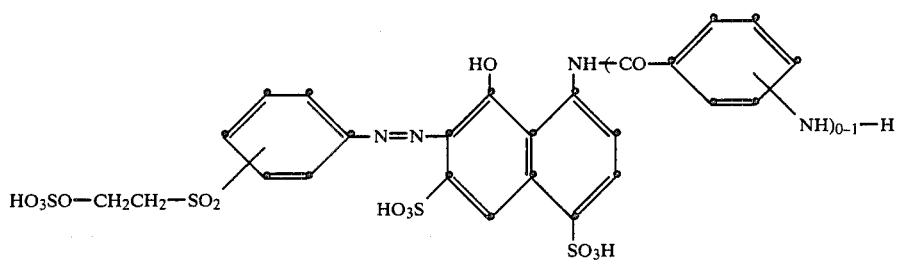
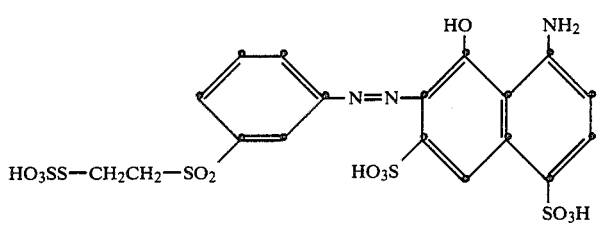
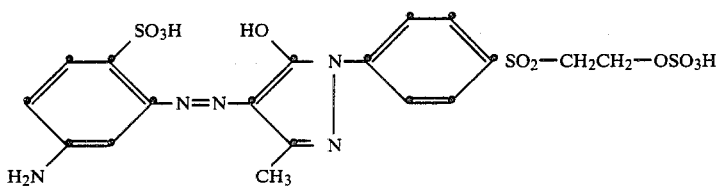
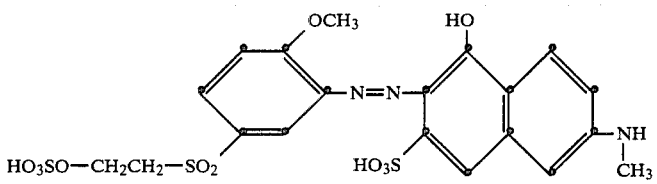
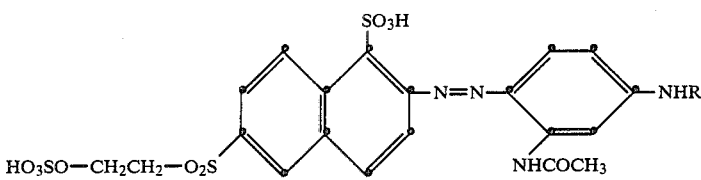
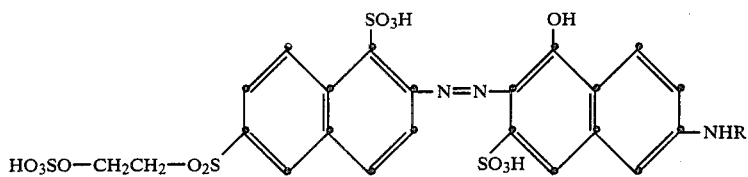
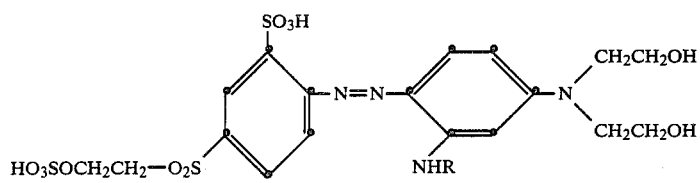

-continued
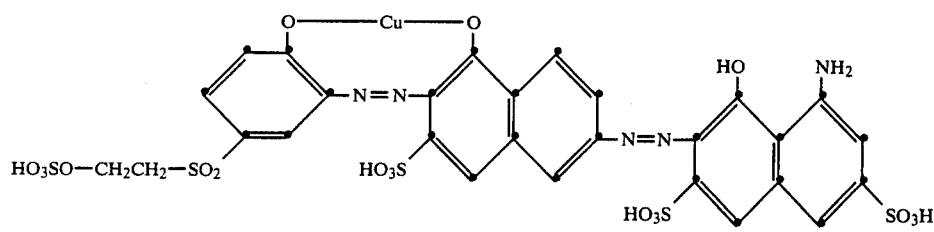
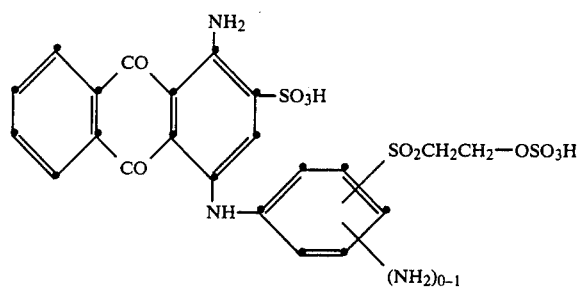
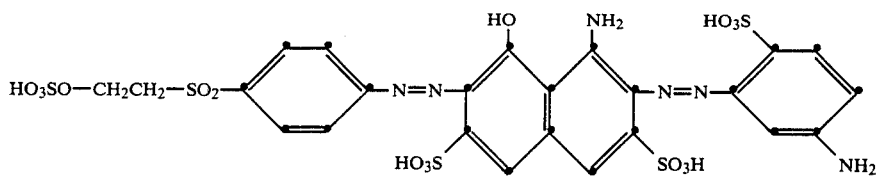
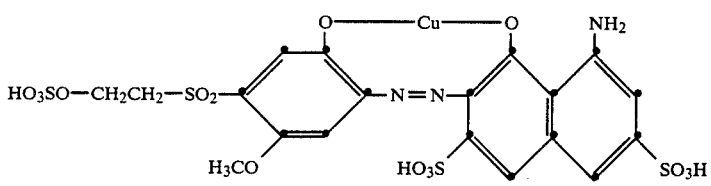
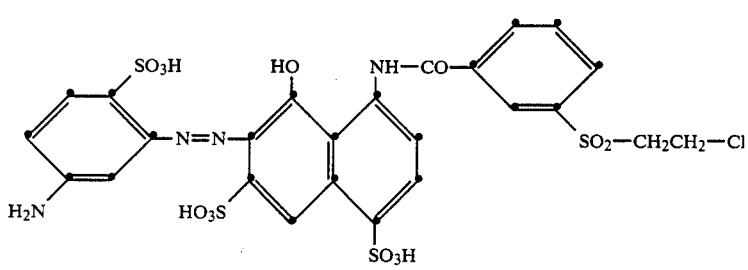
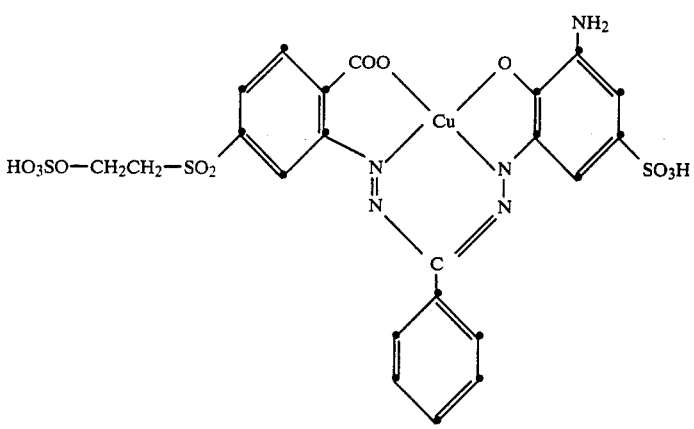

-continued
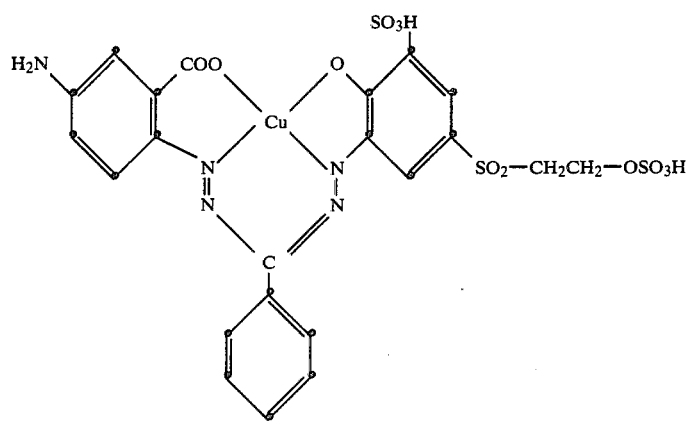
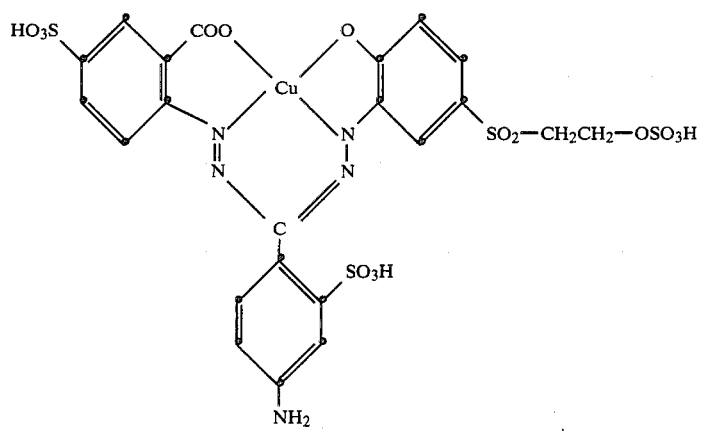
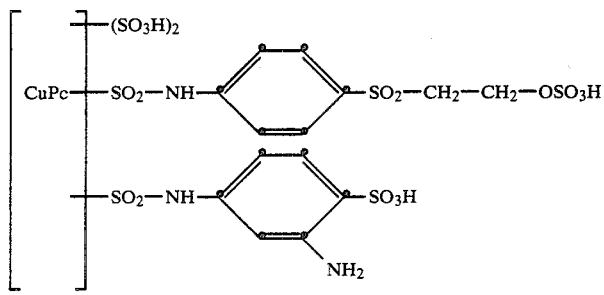
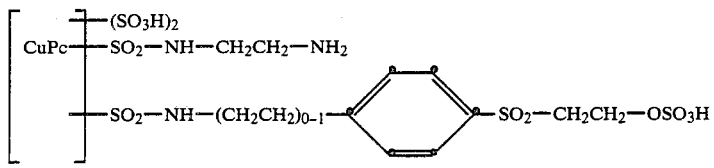
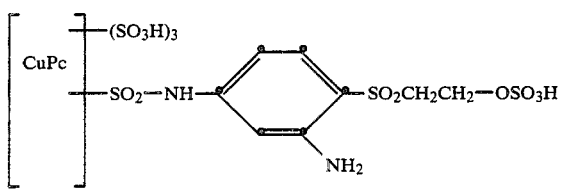

-continued
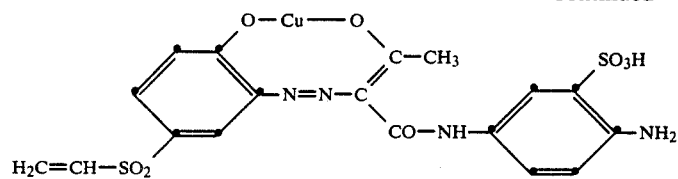
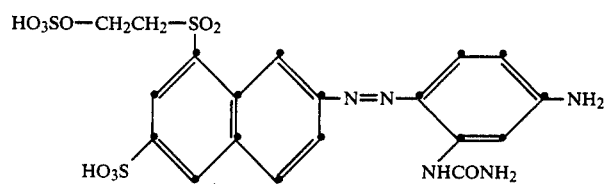
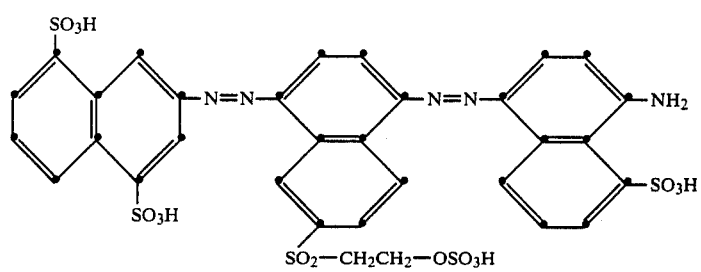
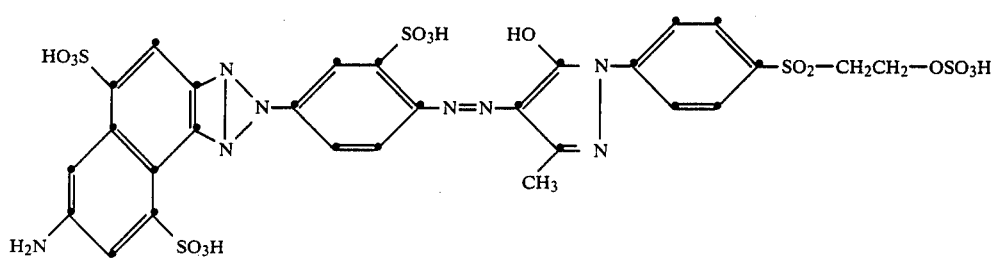
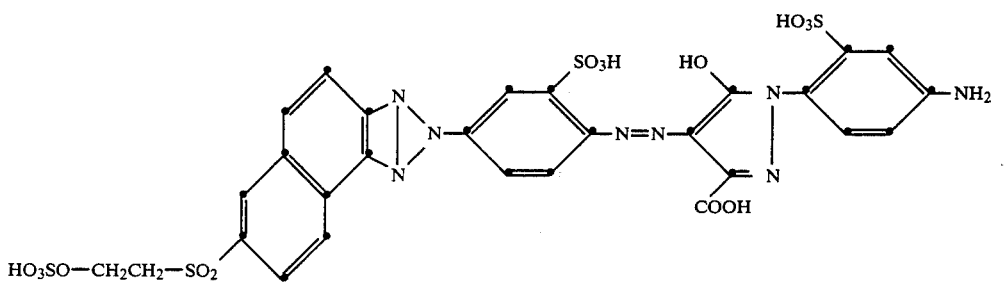
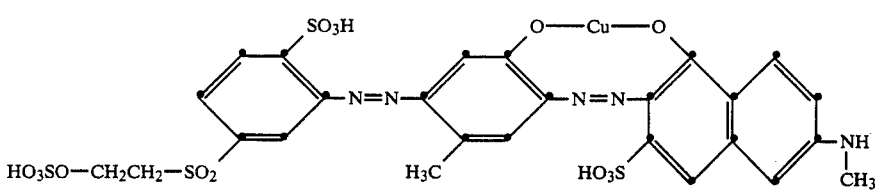
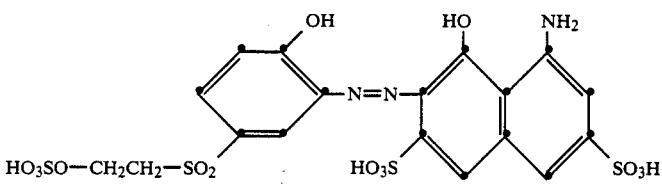
1:2 chromium complex

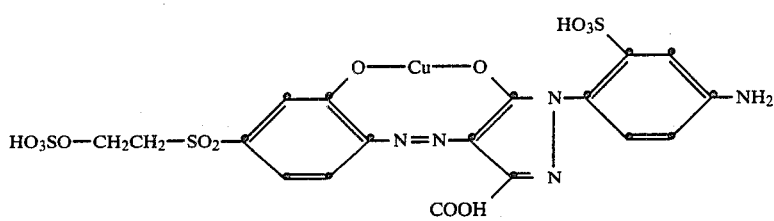
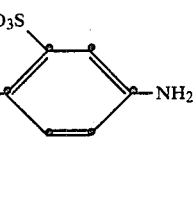

Examples of further monoreactive dyes containing a free amino group are:

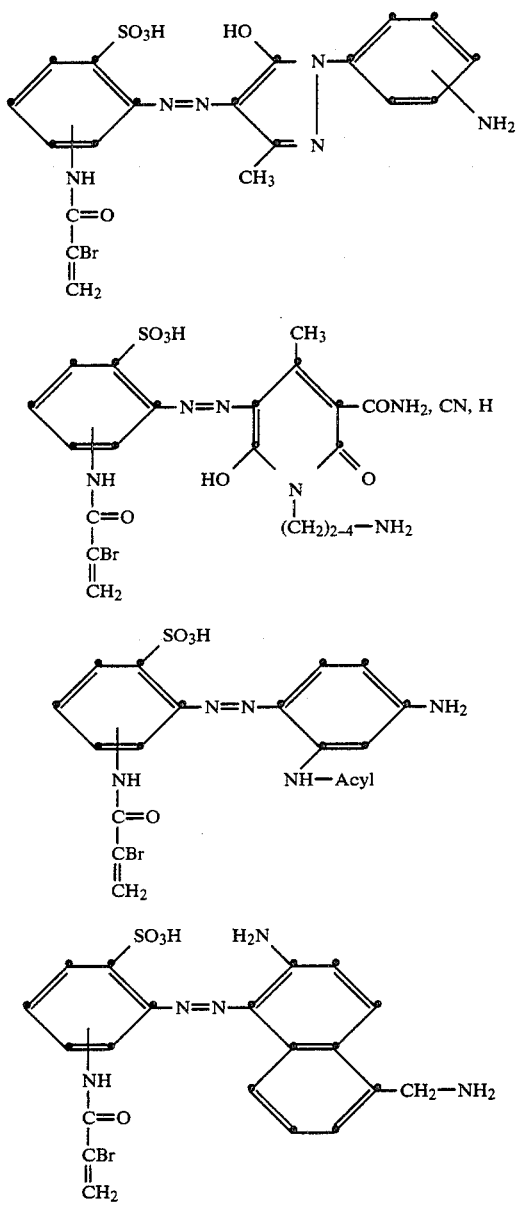

wherein acyl is as defined above.

Mention may also be made of those reactive compounds which can also be obtained via appropriate methylol compounds of the method of Einhorn, e.g. 1-amino-3-chloroacetylaminomethylbenzene-6-sulfonic acid.

The acylation reacations with the fibre-reactive acylating agents are advantageously carried out using acid acceptors, such as sodium carbonate or sodium hydroxide, and under such conditions that replaceable halogen atoms, unsaturated bonds or the like still remain in the reactive radical, that is to say, for example, in organic solvents or at relatively low temperatures in aqueous medium.

Silk or silk-containing fibre blends are dyed or printed by the process of the invention. Suitable silk comprises not only natural or cultured silk (mulberry silk, Bombyx mori) but also the different wild silks, especially tussah silk, and also eria and fagara silk, nester silk, Senegal silk, muga silk, as well as shell silk and spun silk. Silk-containing fibre materials are in particular blends of silk with polyester fibres, acrylic fibres, cellulose fibres, polyamide fibres or wool. The textile material can be broadly in any form of processing, e.g. fibres, yarn, wovens or knits.

In the process of this invention, dyeing is carried out in aqueous medium at a pH value above 8, preferably at pH 9 to 10. The procedure is such that the material to be dyed is put into the dyebath at normal temperature, preferably at 20° to 40° C., at a liquor to goods ratio of 1:50 to 1:150, preferably 1:80 to 1:120, and remains in the dyebath for 6 to 48 hours, preferably for 24 hours, while stirring from time to time, or is impregnated in a padding liquor, preferably at a liquor ratio of 1:0.7 to 1:1.3, and subsequently stored in the moist state for 6 to 48 hours, preferably for 24 hours, at a temperature from 20° to 60° C. The temperature interval at which dyeing is best carried out depends on the material, the nature of the reactive dye, and on the desired depth of shade.

Examples of alkaline acid acceptors employed for carrying out the process of the invention in the alkaline pH range are: sodium hydroxide, potassium hydroxide, trisodium phosphate, disodium phosphate and, in particular, sodium carbonate or mixtures of sodium carbonate and sodium bicarbonate, optionally together with neutral salts such as sodium chloride.

In the cold pad-batch dyeing method of this invention, the dyebath contains one or more of the above mentioned alkalies and optionally further auxiliaries such as wetting agents, e.g. dioctyl sulfosuccinate, and thickeners, e.g. alginate thickeners, and neutral inorganic salts such as alkali metal chlorides or alkali metal sulfates.

An important pad method for fixing the dyes on silk or silk-containing fabric is the vat winding-up method or its variant, the cold pad-batch dyeing process. In these methods, the textile material is wound onto a roll and stored, the wound material being packed airtight to prevent drying and atmospheric $CO_2$ from reacting with the alkalies present in the rolled fabric and thereby causing insufficient dye fixation.

Depending on the desired depth of shade, the dyes are employed in concentrations of 0.1 to 15%.

After fixation, the dyeings or prints are thoroughly rinsed with cold and hot water, optionally with the addition of an agent which acts as a dispersant and promotes the diffusion of non-fixed dye.

A preferred embodiment of the process comprises washing off the dyed goods in an aqueous wash liquor at pH 8.5 to 9 and elevated temperature, preferably in the range from 70° to 85° C., optionally in the presence of a non-ionic detergent.

The dyeings obtained with the reactive dyes employed in the process of this invention are distinguished by clear shades. High degrees of fixation and good build-up are obtained and the dyeings have good lightfastness and very good wetfastness properties.

The invention is illustrated by the following Examples in which percentages are by weight, unless otherwise indicated.

EXAMPLE 1

30 g of the dye of the formula

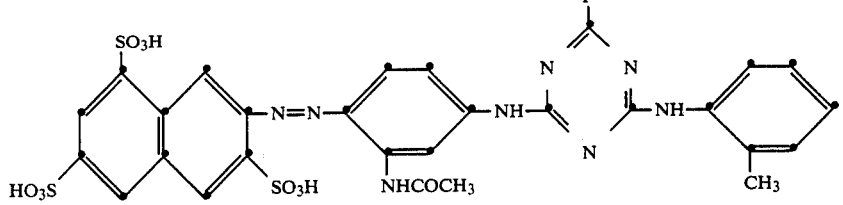

500 g of the dye of the formula

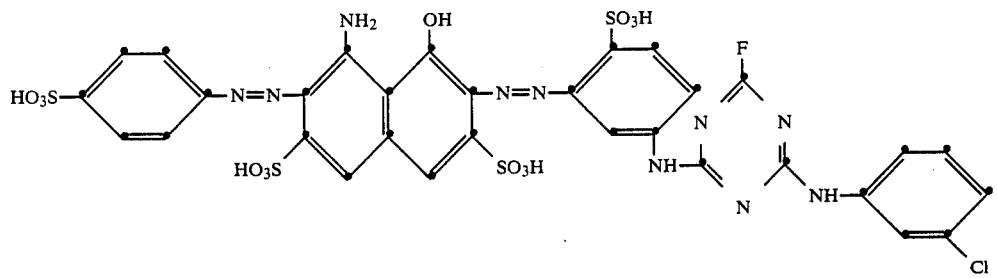

and 80 g of the dye of the formula

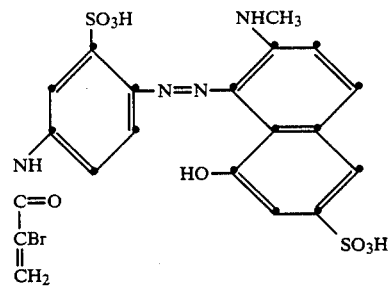

are stirred cold with 1 liter of water to a paste, which is then dissolved by adding 6 liter of hot water. Then 10 g of dioctyl sulfosuccinate are added. The solution is cooled to 25° C. and then 200 g of sodium carbonate and 2 kg of 6% alginate thickener are added and the volume is made up to 10 liters with water. The pH of the padding liquor is 10. 110 m of silk fabric with a weight per unit area of 80 g/m² are impregnated with this liquor on a padder and pinched-off to a pick-up of 90%. The impregnated fabric is wrapped airtight in plastic on a batch-up roller and stored for 48 hours at 25°–27° C. The dyed fabric is rinsed for 10 minutes at 40°–50° C. in an open-width washing machine and then washed for 15 minutes at 80° C. with 2 g/l of a nonionic detergent (obtained by addition of 10 equivalents of ethylene oxide to p-nonyl phenol) to remove non-fixed dye, while adjusting the pH of the wash liquor to 8.5–9 with sodium carbonate, if required. The fabric is then rinsed for 5 minutes with water of 40° C., and subsequently for 5 minutes with water of 20° C. to which 1 g/l of acetic acid is added. The fabric is squeezed out and dried in conventional manner. The deep, level blue dyeing so obtained has excellent wetfastness properties and can be used as a ground for a subsequent discharge point.

EXAMPLE 2

2 kg of the 1:2 chromium complex containing a dye molecule of each of the formulae

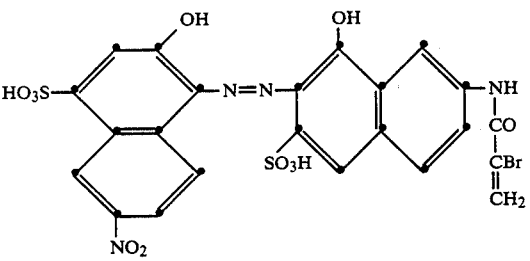

and

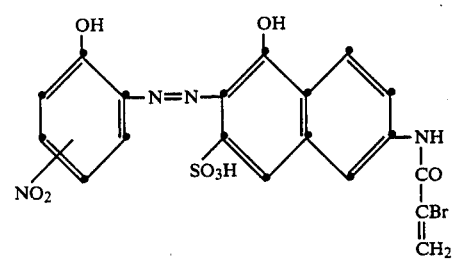

are dissolved in 15 liters of hot water. Then 20 g of dioctyl sulfosuccinate are added to the solution, which is cooled to 25° C. 400 g of sodium carbonate are added to the solution and homogenised by stirring. Then 4 kg of 6% alginate thickener are added and the solution is made up to a volume of 20 liters with water. This padding liquor has a pH of 10. Then 18 kg of tussah silk with a weight per unit area of 80 g/m² are impregnated on a padder with this liquor and pinched-off to a pick-up of 100%. The impregnated fabric is batched-up at 60° C. in a steam-heated chamber and the batch is slowly rotated for 24 hours at 60° C. The dyed fabric is then rinsed for 10 minutes at 40°–50° C. on an open-width washing machine and subsequently given a washing off with 2 g/l of a nonionic detergent obtained by addition of 10 equivalents of ethylene oxide to p-nonyl phenol to remove non-fixed dye, while adjusting the pH of the wash liquor to pH 8.5–9 by adding sodium carbonate, if required. The fabric is washed for 5 minutes with water of 40° C. and for 5 minutes with water of 20° C. to which 1 g/l of acetic acid is added. The fabric is then squeezed out and dried in conventional manner. The deep, level black dyeing so obtained has excellent wetfastness properties.

EXAMPLE 3

1 kg of the dye of the formula

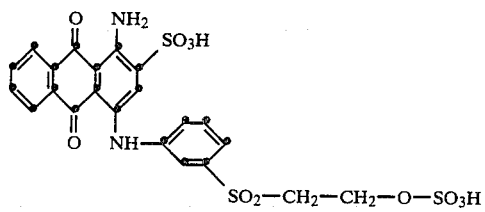

is dissolved in 14 liters of hot water. Then 20 g of dioctyl sulfosuccinate are added to the solution, which is cooled to 25° C. 400 g of sodium carbonate are added to the solution and homogenised by stirring. Then 4 kg of 6% alignate thickener are added and the solution is made up to a volume of 20 liters with water. This padding liquor has a pH of 10. Then 18 kg of silk fabric with a weight per unit area of 80 g/m² are impregnated on a padder with this liquor and pinched-off to a pick-up of 100%. The impregnated fabric is batched-up at 60° C. in a steam-heated chamber and the batch is slowly rorated for 24 hours at 60° C. The dyed fabric is then rinsed for 10 minutes at 40°–50° C. on an open-width washing machine and subsequently given a washing off with 2 g/l of a nonionic detergent obtained by addition of 10 equivalents of ethylene oxide to p-nonyl phenol to remove non-fixed dye, while adjusting the pH of the wash liquor to pH 8.5–9 by adding sodium carbonate, if required.

The fabric is washed for 5 minutes with water of 40° C. and for 5 minutes with water of 20° C. to which 1 g/l of acetic acid is added. The fabric is then squeezed out and dried in conventional manner. The brilliant, level blue dyeing so obtained has excellent wetfastness properties.

EXAMPLE 4

90 g of the dye of the formula

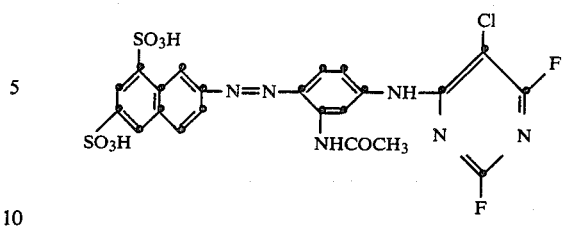

are dissolved in 12 liters of hot water. Then 20 g of dioctyl sulfosuccinate are added to the solution, which is cooled to 25° C. 400 g of sodium carbonate are added to the solution and homogenised by stirring. Then 5 kg of 6% alginate thickener are added and the solution is made up to a volume of 20 liters with water. This padding liquor has a pH of 10. Then 18 kg of silk fabric with a weight per unit area of 100 g/m² are impregnated on a padder with this liquor and pinched-off to a pick-up of 90%. The impregnated fabric is batched-up at 25° C. on a roller, wrapped airtight in plastic and stored for 6 hours at 25° to 27° C. The dyed fabric is then rinsed for 10 minutes at 40°–50° C. on an open-width washing machine and then washed for 15 minutes at 80° C. with 2 g/l of a nonionic detergent (obtained by addition of 10 equivalents of ethylene oxide of p-nonyl phenol) to remove non-fixed dye, while adjusting the pH of the wash liquor to pH 8.5–9 by adding sodium carbonate, if required. The fabric is washed for 5 minutes with water of 40° C. and for 5 minutes with water of 20° C. to which 1 g/l of acetic acid is added. The fabric is then squeezed out and dried in conventional manner. The brilliant, level yellow dyeing so obtained has excellent wetfastness properties.

EXAMPLE 5

200 g of silk fabric to which wax resists have been applied are put at 25°–30° C. into 20 liters of an aqueous liquor which contains 3 g of the dye of the formula

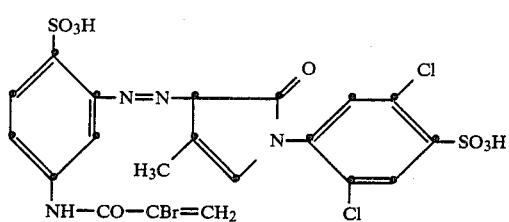

4 g of the dye of the formula

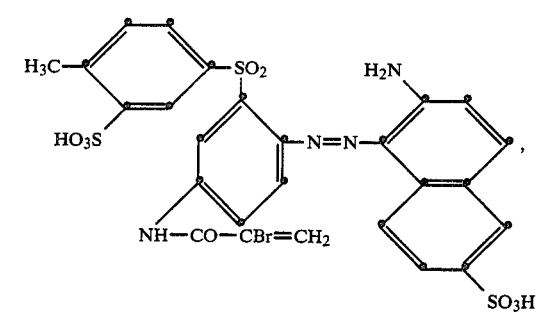

3 g of the dye of the formula

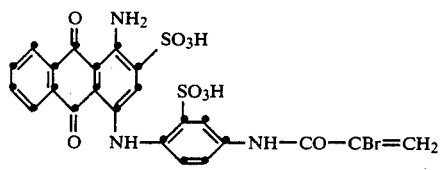
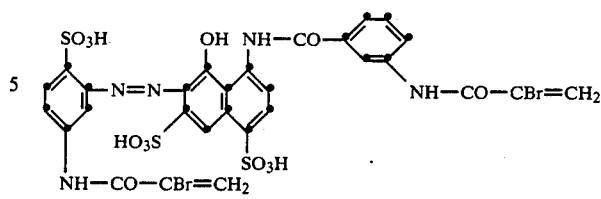

400 g of sodium carbonate and 1200 g of NaCl. The fabric is kept in the liquor for 24 hours at 25°–30° C. while agitating it from time to time.

The fabric is then washed for 20 minutes at 80° C. in a wash bath which contains 2 g/l of a nonionic detergent (obtained by addition of 10 equivalents to ethylene oxide to p-nonyl phenol) to remove the wax resist and non-fixed dye, then rinsed and dried. A brown dyeing with excellent wetfastness properties and a perfect resist is obtained.

EXAMPLE 6

200 g of silk fabric to which wax resists have been applied are put into 20 liters of an aqueous liquor which contains 10 g of the dye of the formula 400 g of sodium carbonate and 1200 g of NaCl. The fabric is kept in the liquor for 12 hours at 25°–30° C. while agitating it from time to time.

The fabric is then washed for 20 minutes at 80° C. in a wash bath which contains 2 g/l of a nonionic detergent (obtained by addition to 10 l equivalents of ethylene oxide to p-nonyl phenol) to remove the wax resist and non-fixed dye, then rinsed and dried. A red dyeing with excellent wetfastness properties and a perfect resist is obtained.

Dyeings with very good wetfastness properties are obtained by carrying out the procedures described in Examples 1 to 6 using equimolar amounts of the dyes listed in column 2 of the following Table. The shades are indicated in column 3.

TABLE

| Example | Dye | Shade |
|---|---|---|
| 1 |  | red |
| 2 |  | blue |
| 3 |  | blue |

TABLE-continued
| Example | Dye | Shade |
|---|---|---|
| 4 | 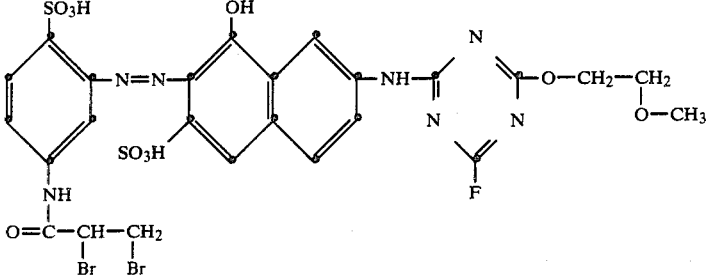 | scarlet |
| 5 | 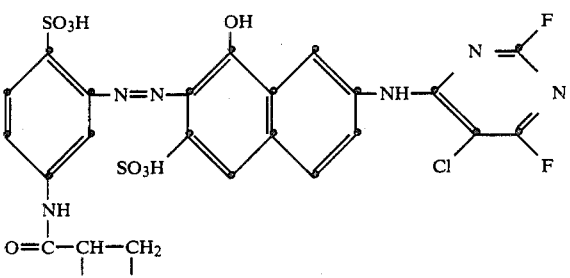 | scarlet |
| 6 | 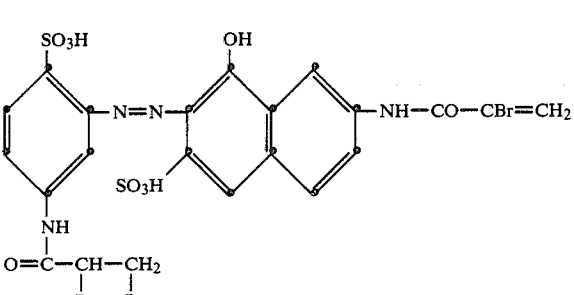 | scarlet |
| 7 | 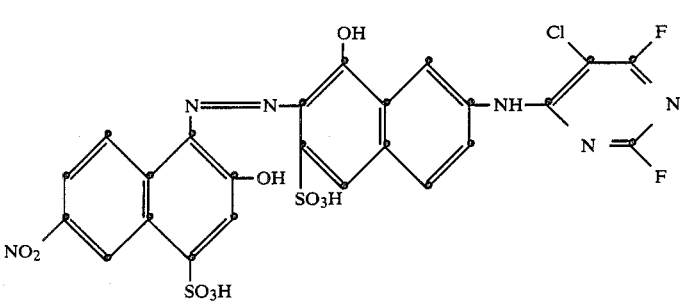<br>1:2-Co-mixed complex | black |

TABLE-continued
| Example | Dye | Shade |
|---|---|---|
| 8 | 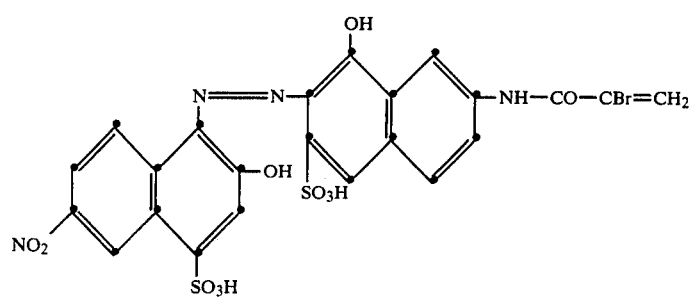 1:2-Co-mixed complex | black |
| 9 | 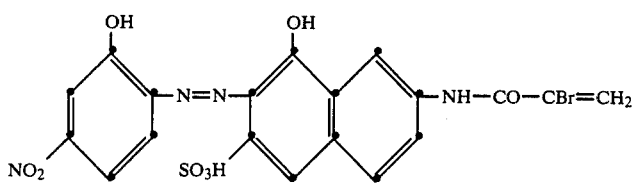 | red |
| 10 | 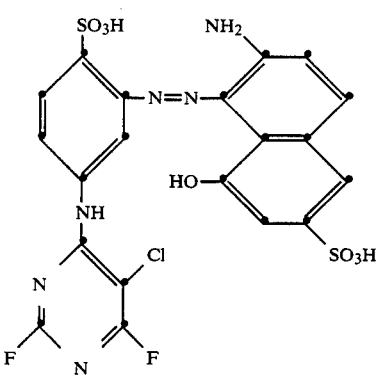 | red |

TABLE-continued

| Example | Dye | Shade |
|---|---|---|
| 11 | | red |
| 12 | | red |
| 13 | | blue |
| 14 | | blue |

TABLE-continued

| Example | Dye | Shade |
|---|---|---|
| 15 | (anthraquinone structure with NH₂, SO₃H, and NH—CO—CBr=CH₂ substituents) | blue |
| 16 | (azo dye structure with SO₃H, triazine with F, and dichlorophenyl pyrazolone) | yellow |
| 17 | (azo dye structure with SO₃H, H₂C=BrC—CO—NH, and dichlorophenyl pyrazolone) | yellow |
| 18 | (azo dye with SO₃H, difluoro-chloro-pyrimidine amino, and dichlorophenyl pyrazolone) | yellow |
| 19 | (naphthol azo dye with SO₃H, OH, CH₃O, and fluorotriazine-N-methylanilino group) | scarlet |

4,568,350
TABLE-continued
| Example | Dye | Shade |
|---|---|---|
| 20 | 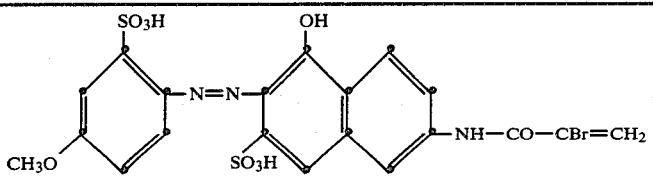 | scarlet |
| 21 | 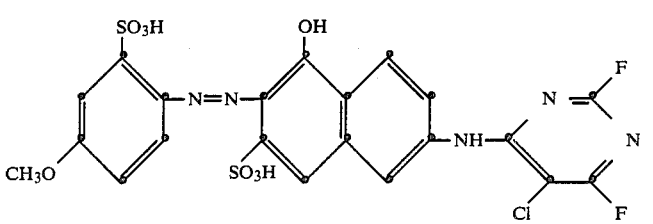 | scarlet |
| 22 | 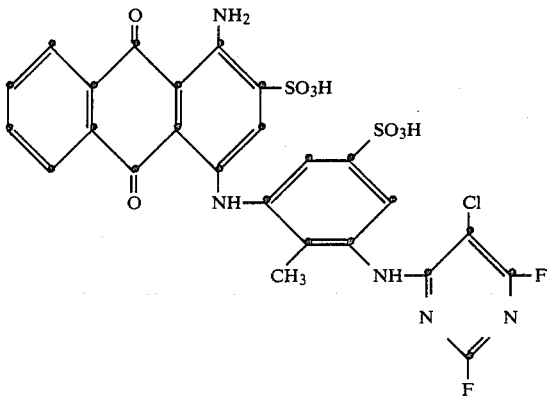 | blue |
| 23 | 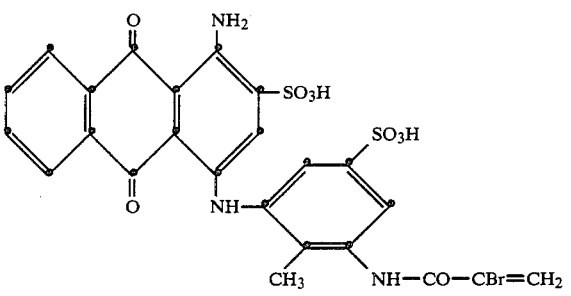 | blue |
| 24 | 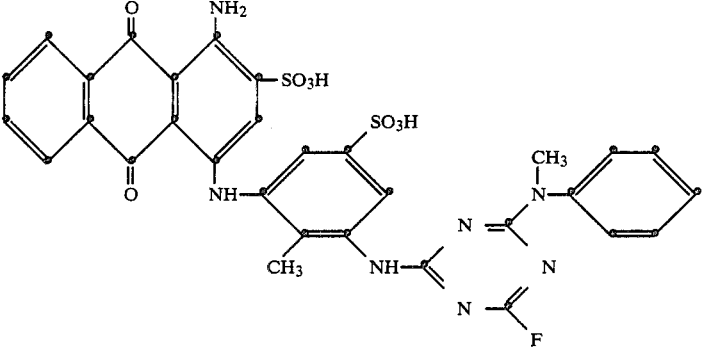 | blue |

| Example | Dye | Shade |
|---|---|---|
| 25 | 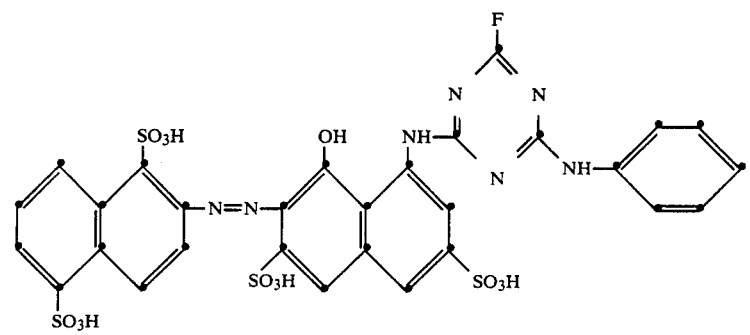 | red |
| 26 | 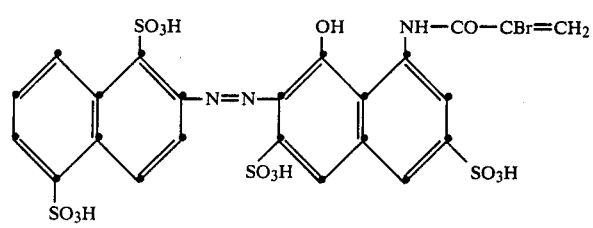 | red |
| 27 | 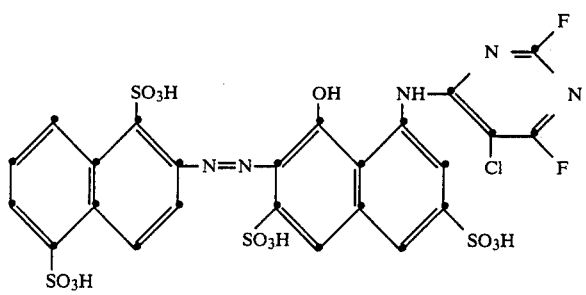 | red |
| 28 | 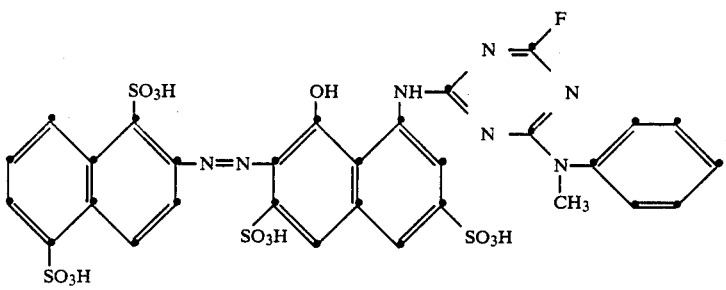 | red |

TABLE-continued
| Example | Dye | Shade |
|---|---|---|
| 29 | 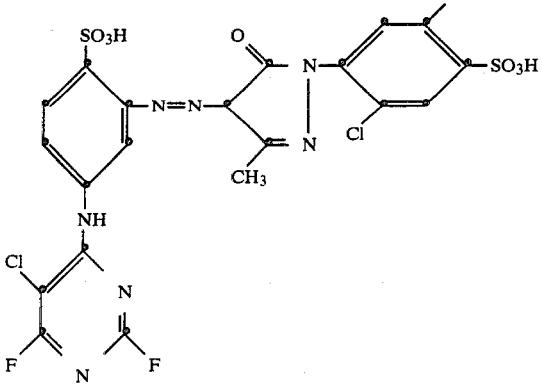 | yellow |
| 30 | 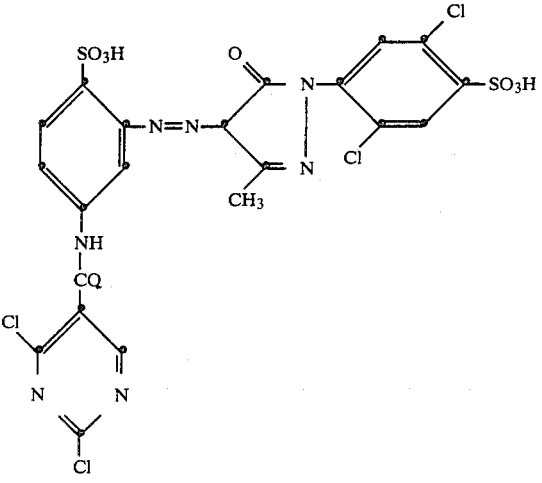 | yellow |
| 31 | 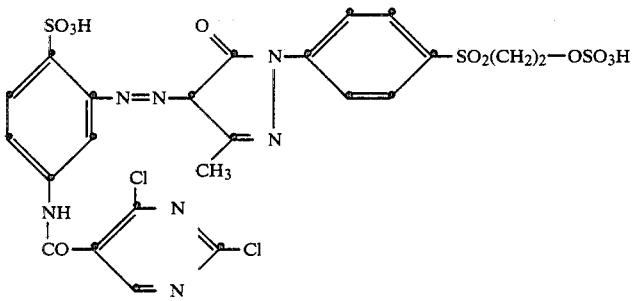 | yellow |
| 32 | 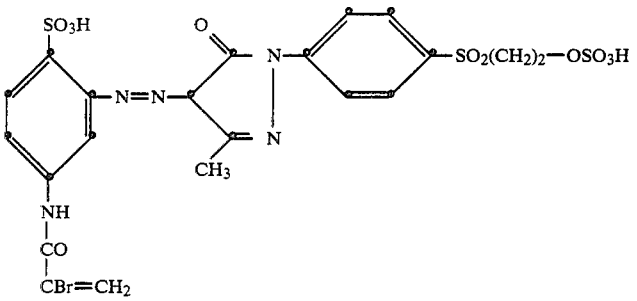 | yellow |

| Example | Dye | Shade |
|---|---|---|
| 33 | 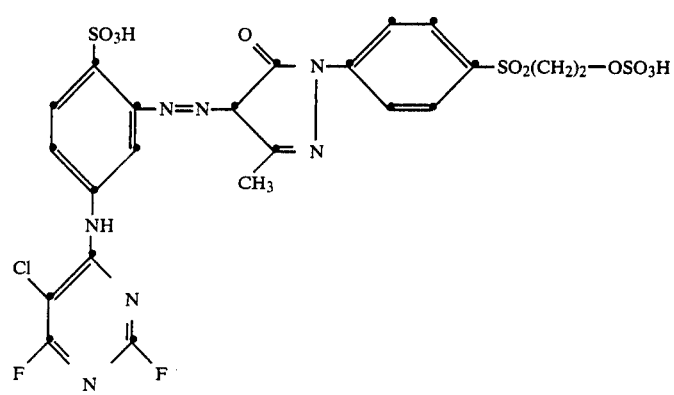 | yellow |
| 34 | 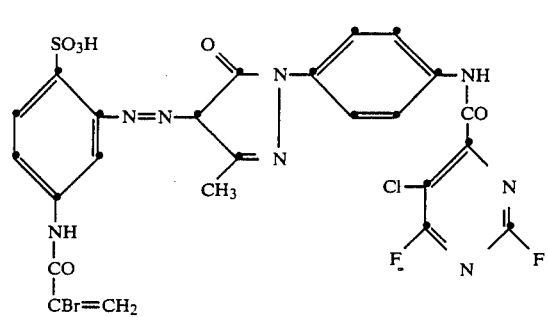 | yellow |
| 35 | 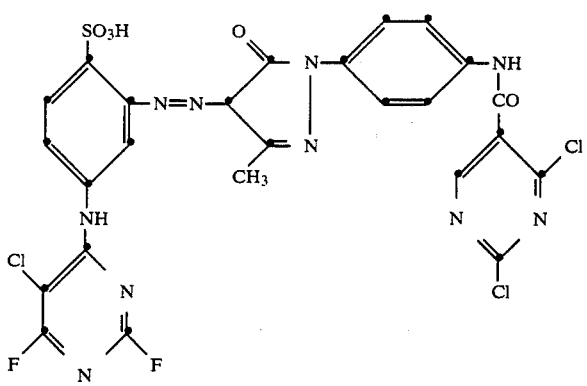 | yellow |
| 36 | 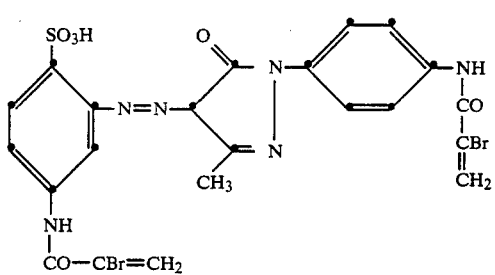 | yellow |

TABLE
| Example | Dye | Shade |
|---|---|---|
| 37 | 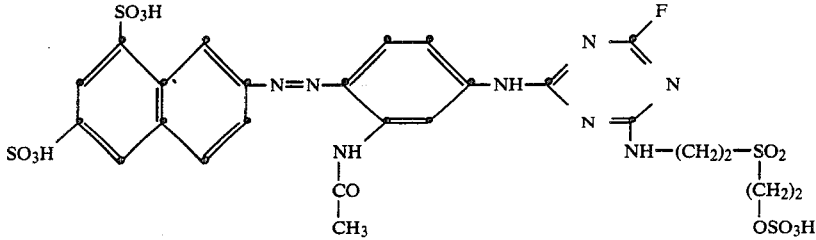 | yellow |
| 38 | 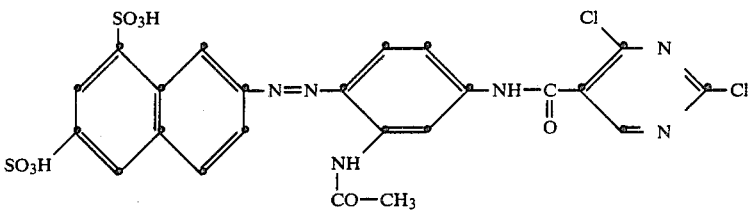 | yellow |
| 39 | 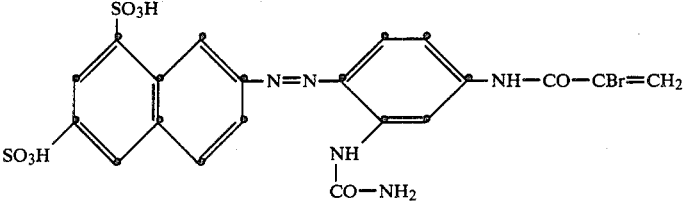 | yellow |
| 40 | 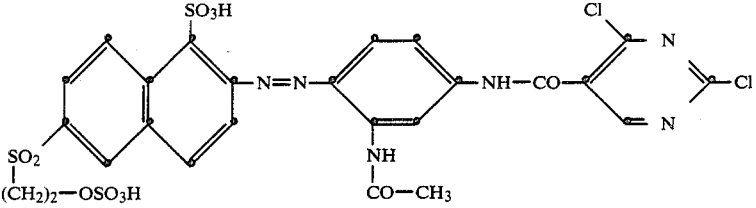 | yellow |
| 41 | 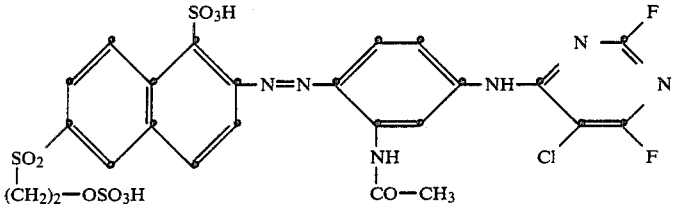 | yellow |
| 42 | 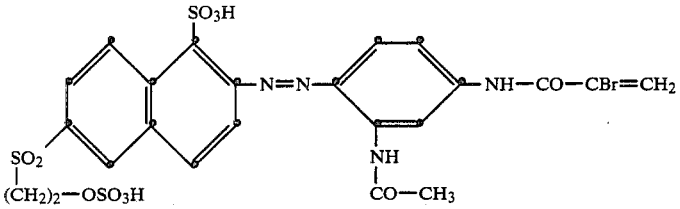 | yellow |

TABLE-continued
| Example | Dye | Shade |
|---|---|---|
| 43 | 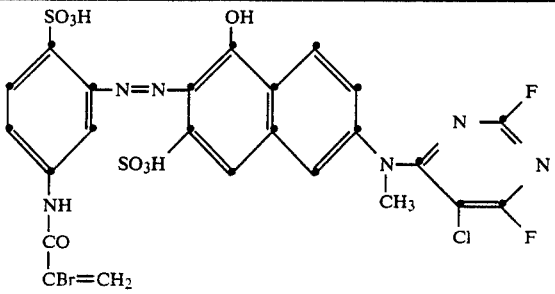 | orange |
| 44 | 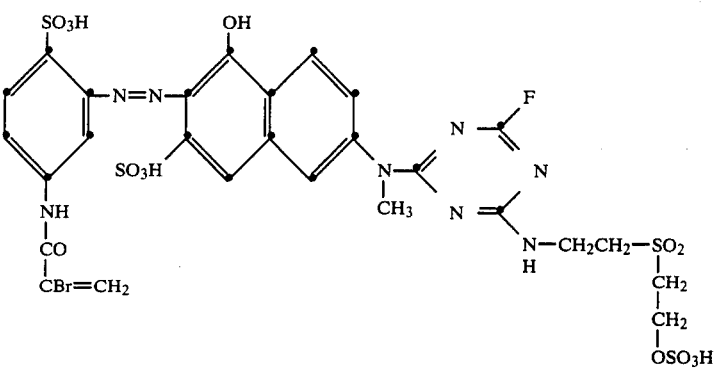 | orange |
| 45 | 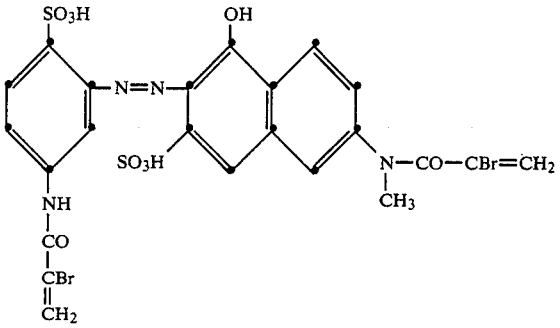 | orange |
| 46 | 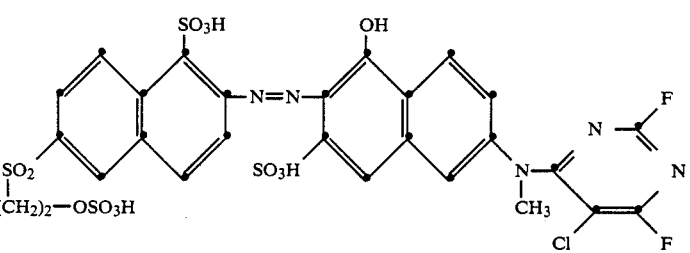 | orange |
| 47 | 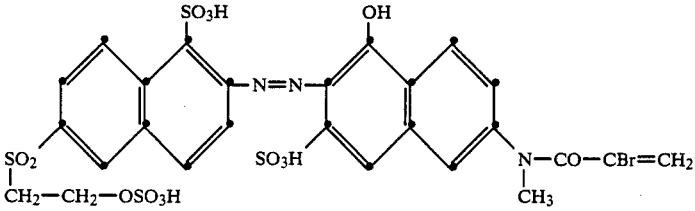 | orange |

TABLE-continued
| Example | Dye | Shade |
|---|---|---|
| 48 | 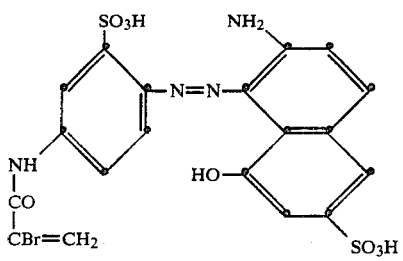 | red |
| 49 | 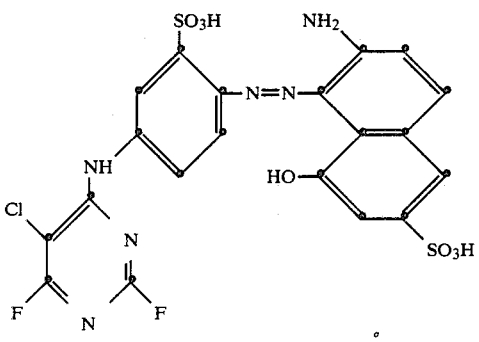 | red |
| 50 | 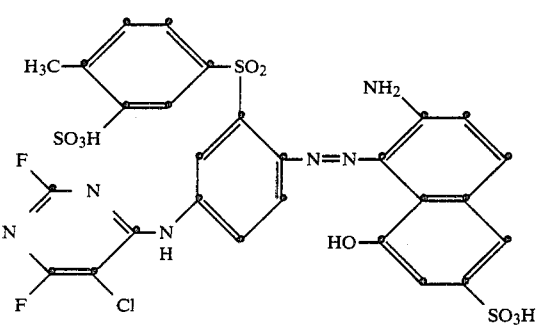 | red |
| 51 | 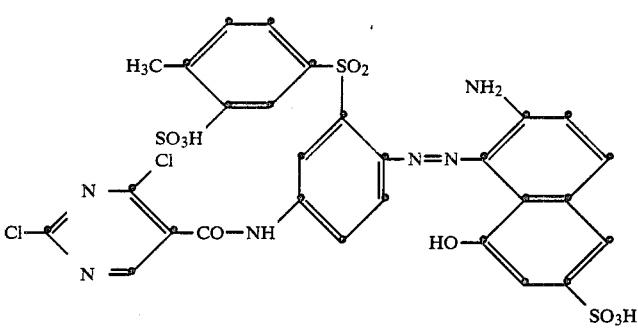 | red |

TABLE-continued

| Example | Dye | Shade |
|---------|-----|-------|
| 52 | Structure: 2-SO₃H-phenyl-N=N-[4-(N(C₂H₅)(CH₂CH₂OH)), 2-CH₃-phenyl]; with 5-NH-[triazine substituted with F and NH(CH₂)₂—SO₂—(CH₂)₂—OSO₃H] | orange |
| 53 | Structure: 2-SO₃H-phenyl-N=N-[4-(N(C₂H₅)(CH₂CH₂OH)), 2-CH₃-phenyl]; with 5-NH-[C(Cl)=C-pyrimidine with two F substituents] | orange |
| 54 | Structure: 4-[O₂S-(CH₂)₂-OSO₃H], 2-SO₃H-phenyl-N=N-[4-N(CH₂CH₂OH)₂-phenyl]; with NH-[C(Cl)=C-pyrimidine with two F substituents] on the coupling ring | orange |
| 55 | Structure: 4-[O₂S-CH₂CH₂-OSO₃H], 2-SO₃H-phenyl-N=N-[4-N(CH₂CH₂OH)₂-phenyl]; with NH-CO-CBr=CH₂ | orange |
| 56 | Structure: 2-SO₃H, 5-NH-CO-CBr=CH₂-phenyl-N=N-[1-OH, 3-SO₃H, 6-NH-CO-(C(Cl)=C-pyrimidine-Cl)-naphthyl] | orange |

TABLE-continued

| Example | Dye | Shade |
|---|---|---|
| 57 | (structure) | orange |
| 58 | (structure) | red |
| 59 | (structure) | red |
| 60 | (structure) | red |
| 61 | (structure) | red |

| Example | Dye | Shade |
|---|---|---|
| 62 | 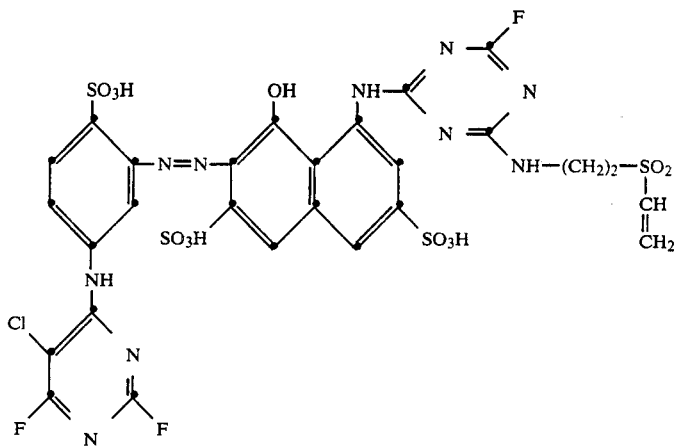 | red |
| 63 | 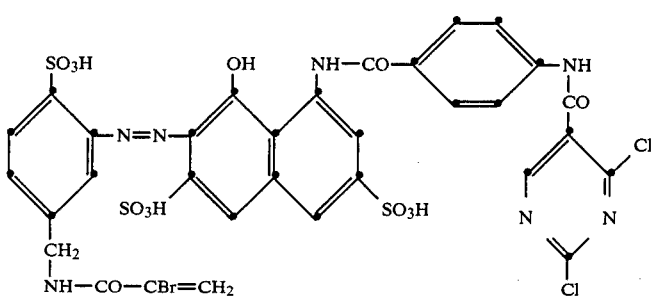 | red |
| 64 | 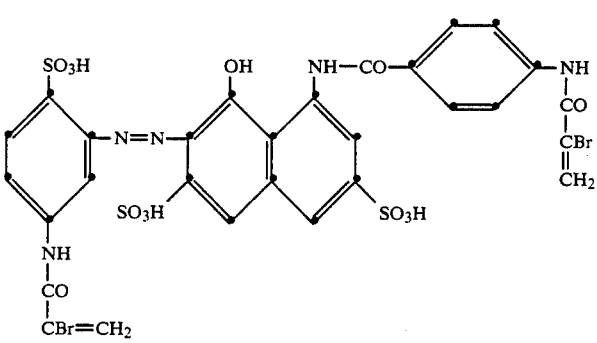 | red |
| 65 | 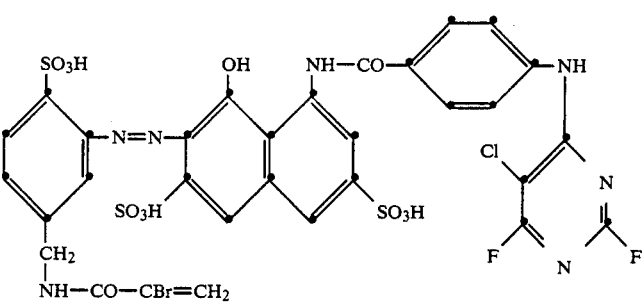 | red |

TABLE-continued

| Example | Dye | Shade |
|---|---|---|
| 66 | (anthraquinone with NH2, SO3H; NH-linked to dimethyl-SO3H-dimethyl-phenyl with CH2-NH-C(=)-pyrimidine bearing F, F, Cl substituents) | blue |
| 67 | (anthraquinone with NH2, SO3H; NH-linked to dimethyl-SO3H-dimethyl-phenyl with CH2-NH-CO-pyrazine bearing Cl, Cl substituents) | blue |
| 68 | (bis-phenyl dioxazine chromophore with chloro substituents, SO3H groups, CH2CH2-NH linkers to fluoro-triazines bearing disulfonated anilino groups on both sides) | blue |
| 69 | (anthraquinone with NH2, SO3H; NH-linked to dimethyl-SO3H-phenyl with NH—CO—CBr=CH2) | blue |

| Example | Dye | Shade |
|---|---|---|
| 70 | 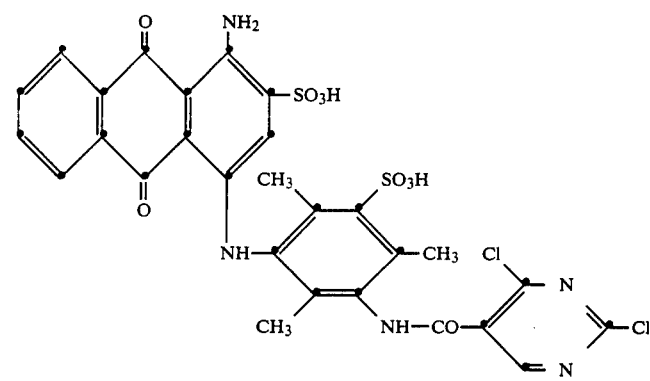 | blue |
| 71 | 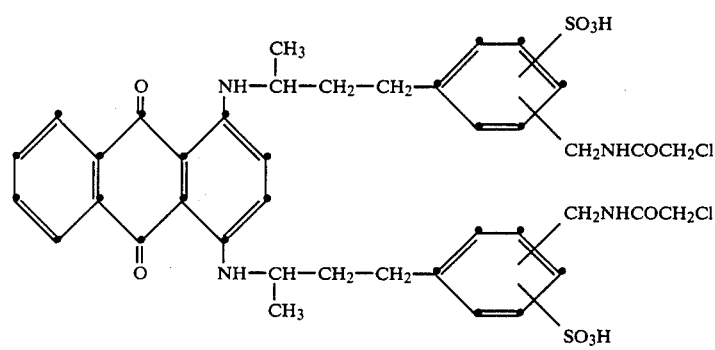 | blue |
| 72 | 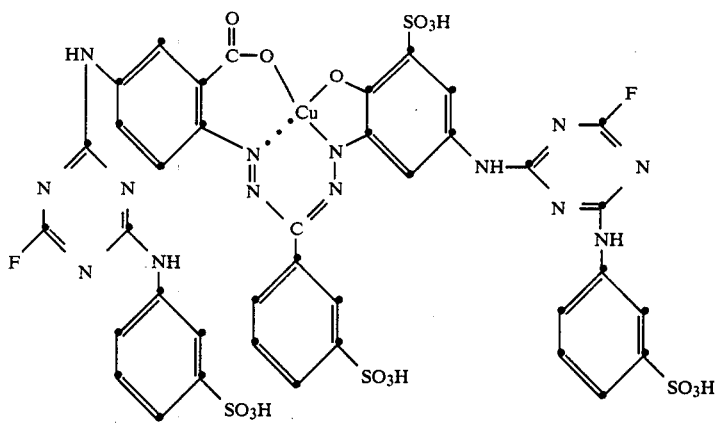 | blue |

TABLE-continued

| Example | Dye | Shade |
|---|---|---|
| 73 | (structure) | blue |
| 74 | (structure) | blue |
| 75 | (structure) | blue |
| 76 | CuPc—SO$_2$NHCH$_2$CH$_2$—NH—CO—CBr=CH$_2$, with (SO$_3$H)$_2$ and SO$_2$NH—C$_6$H$_4$—SO$_2$CH$_2$CH$_2$OSO$_3$H substituents | turquoise |

TABLE-continued
| Example | Dye | Shade |
|---|---|---|
| | [CuPc = copper phthalocyanine radical] | |
| 77 | 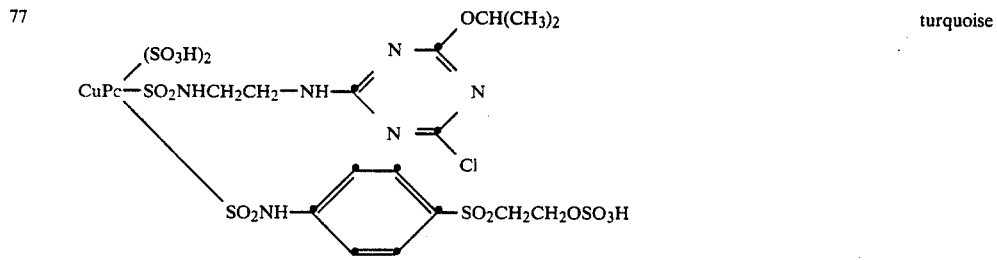 [CuPc = copper phthalocyanine radical] | turquoise |
| 78 | 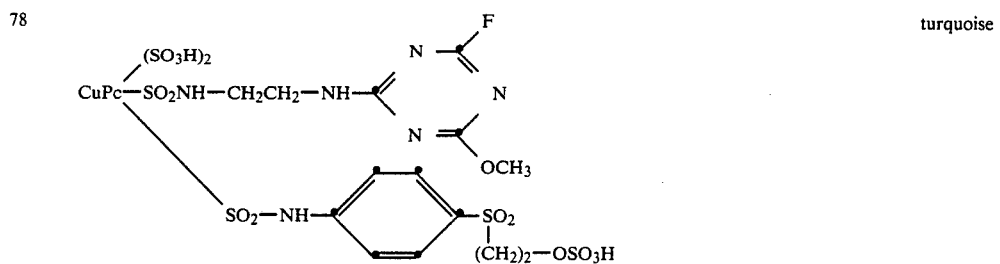 [CuPc = copper phthalocyanine radical | turquoise |
| 79 | 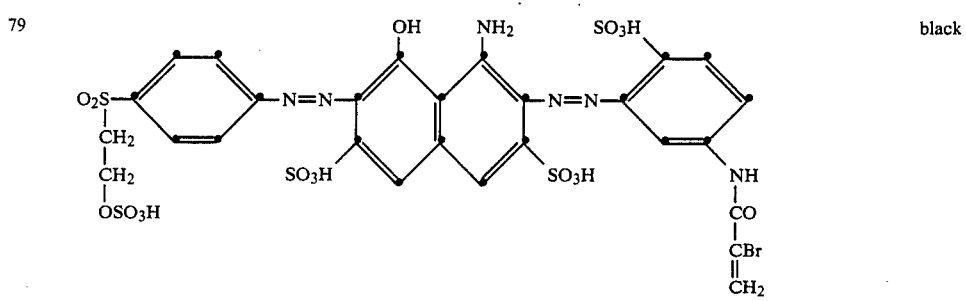 | black |
| 80 | 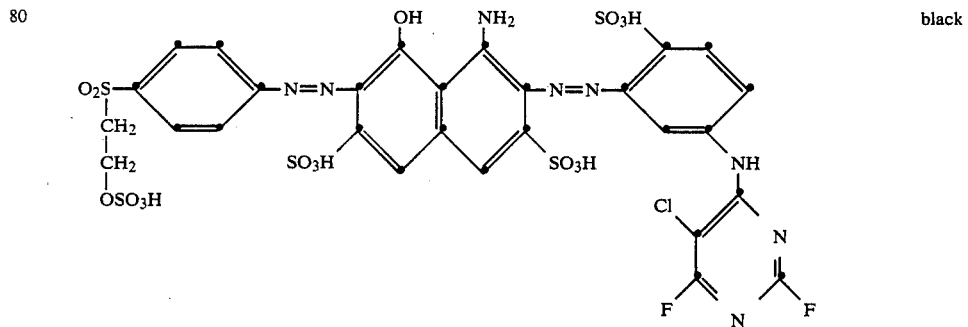 | black |

TABLE-continued
| Example | Dye | Shade |
|---|---|---|
| 81 | 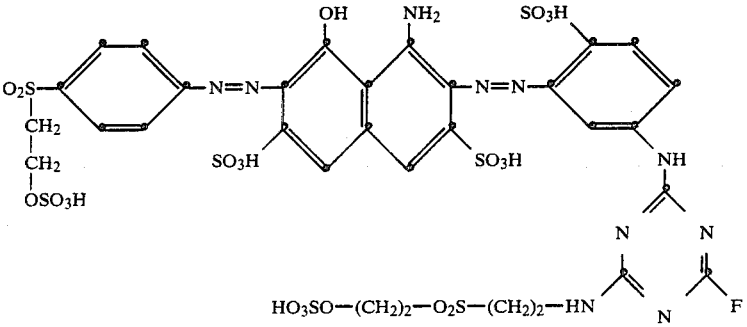 | black |
| 82 | 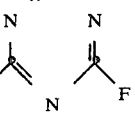 | citron yellow |
| 83 | 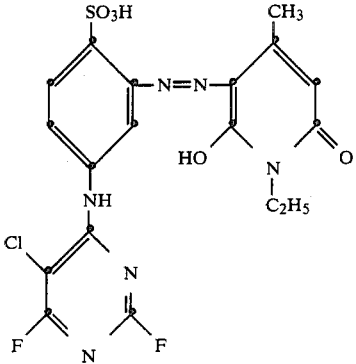 | citron yellow |

TABLE-continued

| Example | Dye | Shade |
|---|---|---|
| 84 | 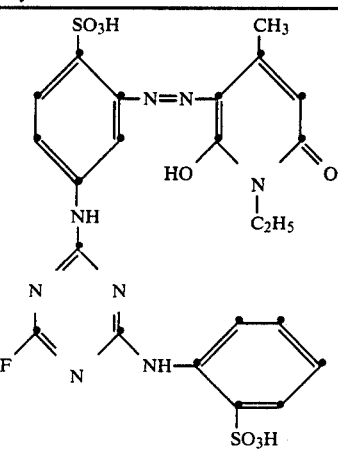 | citron yellow |
| 85 | 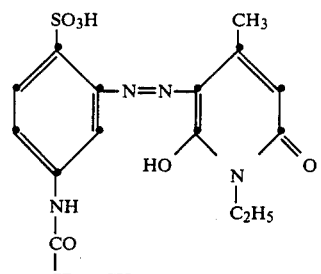 | citron yellow |

What is claimed is:

1. A process for dyeing a material selected from the group consisting of silk and silk-containing fibre blends with reactive dyes, which consists essentially of impregnating said material with an impregant consisting essentially of a reactive dye of the formula

wherein D is the radical of a sulfo group containing dye of the mono- or polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide series, and $[Y]_n$, where n is 1 to 4, denotes identical or different reactive radicals Y, in aqueous medium at a pH value above 8, without the addition of urea, thiourea or sodium cyanoacetate, and storing the impregnated material in a moist state for 6 to 48 hours at a temperature from 20° to 60° C.

2. A process according to claim 1, which comprises impregnating silk or silk-containing fibre blends with a reactive dye of the formula (1), wherein D, Y and n are as defined in claim 1, in an aqueous padding liquor at a pH value above 8, and storing the treated goods in the moist state for 24 hours at a temperature from 20° to 60° C.

3. A process according to claim 1, which comprises the use of a reactive dye of the formula (1), wherein D is the radical of a monoazo or disazo dye.

4. A process according to claim 1, wherein D is the radical of a heavy metal azo dye complex.

5. A process according to claim 1, which comprises the use of a reactive dye of the formula (1), wherein D is the radical of an anthraquinone dye.

6. A process according to claim 1, which comprises the use of a reactive dye of the formula (1), wherein D is the radical of a copper or nickel phthalocyanine, of a copper formazan complex or of a triphendioxazine.

7. A process according to claim 4, which comprises the use of a reactive dye of the formula (1), wherein D is the radical of a 1:2 chromium or 1:2 cobalt complex azo dye of the benzene or naphthalene series, the chromium or cobalt atom being attached in each case to a metallisable group in the ortho-position to the azo bond.

8. A process according to claim 3, which comprises the use of a reactive dye of the formula

wherein $D_1$ is the radical of a diazo component of the benzene or naphthalene series, K is the radical of a coupling component of the benzene, naphthalene or heterocyclic series, Q is a direct bond, an aminobenzoylamino group or a bridge member —N(R)—, in which R is hydrogen or unsubstituted or substituted $C_1$–$C_4$alkyl, Y and n are as defined in claim 4, and the reactive radical is attached to the diazo component or to the coupling component, or both the diazo component and the coupling component each carry one or two reactive radicals, or two reactive radicals are attached to the coupling component or to the diazo component, or two reactive radicals are attached to the diazo component or to the coupling component, and one reactive dye is attached to the coupling component or to the diazo component.

9. A process according to claim 8, which comprises the use of a reactive dye of the formula (2), wherein R is hydrogen or methyl.

10. A process according to claim 1, which comprises the use of a reactive dye of the formula (1), wherein Y is vinylsulfonyl, sulfatoethylsulfonyl, α-bromoacryloyl, α,β-dibromopropionyl, halopyrimidinyl or halotriazinyl.

11. A process according to claim 10, which comprises the use of a reactive dye of the formula (1), wherein Y is 2,4-difluoro-5-chloropyrimid-6-yl, 2-methylphenylamino-, 2-sulfophenylamino- or 2-chlorophenylamino-4-fluoro-1,3,5-triazin-6-yl, 2-[N-ethyl-N-(methylphenyl- or chlorophenyl- or sulfophenyl-)amino]-4-fluoro-1,3,5-triazine-6-yl, 2-[N-methyl-N-(methlyphenyl- or chlomophenyl or sulfophenyl-)amino]-4-fluoro-1,3,5-triazin-6-yl, α,β-dibromopropionyl, α-bromoacryloyl, 2-(β-chloroethylsulfonylethylamino)-4-fluoro-1,3,5-triazin-6-yl, 2,4-dichloropyrimidinyl-5-carbonyl, 2-chloro-4-isopropoxy-1,3,5-triazin-6-yl or 2-methoxy-4-fluoro-1,3,5-triazin-6-yl.

12. A process according to claim 11, which comprises the use of a reactive dye of the formula (1), wherein Y is α,β-dibromopropionyl or α-bromoacryloyl.

13. A process according to claim 1, wherein the pH is adjusted to 9 to 10.

14. A process according to claim 1, wherein the material is impregnated in the presence of a thickener.

15. A process according to claim 1, wherein the material is impregnated with a padding liquor at a liquor to goods ratio of 1:0.7 to 1:1.3.

16. A process according to claim 1, which further comprises washing the dyed goods with an aqueous wash liquor at a pH of 8.5 to 9 and at elevated temperature, optionally in the presence of a nonionic detergent.

17. A process according to claim 14, wherein the thickener is an alginate thickener.

18. A process according to claim 16, wherein the elevated temperature is in the range from 70° to 85° C.

* * * * *